United States Patent
Kumar et al.

(10) Patent No.: US 12,302,231 B2
(45) Date of Patent: May 13, 2025

(54) METHOD AND SYSTEM OF UE FOR SWITCHING BETWEEN PLURALITY OF SIM NETWORKS

(71) Applicant: Samsung Electronics Co., Ltd., Suwon-si (KR)

(72) Inventors: Lalith Kumar, Bangalore (IN); Alok Kumar Jangid, Bangalore (IN); Kailash Kumar Jha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 17/602,721

(22) PCT Filed: Apr. 9, 2020

(86) PCT No.: PCT/KR2020/004849
§ 371 (c)(1),
(2) Date: Oct. 8, 2021

(87) PCT Pub. No.: WO2020/209641
PCT Pub. Date: Oct. 15, 2020

(65) Prior Publication Data
US 2022/0191778 A1   Jun. 16, 2022

(30) Foreign Application Priority Data
Apr. 9, 2019 (IN) .............................. 201941014220
Apr. 4, 2020 (IN) .............................. 201941014220

(51) Int. Cl.
*H04W 48/18* (2009.01)
*H04W 36/14* (2009.01)
(Continued)

(52) U.S. Cl.
CPC ......... *H04W 48/18* (2013.01); *H04W 36/142* (2023.05); *H04W 68/12* (2013.01); *H04W 88/06* (2013.01)

(58) Field of Classification Search
CPC .............................. H04W 48/18; H04W 68/12
(Continued)

(56) References Cited

U.S. PATENT DOCUMENTS 8,526,946 B2   9/2013   Pattaswamy et al.
9,220,083 B2   12/2015  Nikkelen
(Continued)

FOREIGN PATENT DOCUMENTS

EP   2491753 B1   12/2014
EP   3994927 A1   5/2022
(Continued)

OTHER PUBLICATIONS

Supplementary European Search Report dated Nov. 21, 2022 in connection with European Patent Application No. 20 78 6925, 12 pages.
(Continued)

*Primary Examiner* — Joel Ajayi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
Embodiments herein provide a method for switching between a plurality of SIM networks by a multi SIM UE in
(Continued)

a wireless communication network. The method includes determining, by the multi SIM that the multi SIM UE needs to initiate an active data session on a second SIM network based on one of a paging message received by the multi SIM UE from the second SIM network and at least one MO activity which needs to be delivered using the second SIM network. Further, the method includes sending, by the multi SIM UE, a leaving operator message to the first SIM network indicating that the multi SIM UE is leaving the first SIM network; and switching, by the multi SIM UE, from the first SIM network to the second SIM network by triggering procedures to initiate the active data session on the second SIM network.

12 Claims, 20 Drawing Sheets

(51) Int. Cl.
    *H04W 68/12*     (2009.01)
    *H04W 88/06*     (2009.01)

(58) Field of Classification Search
    USPC .......................................... 455/550.1, 553.1
    See application file for complete search history.

(56) References Cited

U.S. PATENT DOCUMENTS

| | | |
|---|---|---|
| 2013/0150014 A1 | 6/2013 | Gong et al. |
| 2014/0106747 A1 | 4/2014 | Josso et al. |
| 2014/0128082 A1 | 5/2014 | Chirayil |
| 2015/0245309 A1 | 8/2015 | Nayak et al. |
| 2016/0295550 A1 | 10/2016 | Sharma et al. |
| 2017/0150545 A1 | 5/2017 | Ramkumar et al. |
| 2017/0230932 A1 | 8/2017 | Challa et al. |
| 2018/0077682 A1 | 3/2018 | Li et al. |
| 2018/0270649 A1 | 9/2018 | Tsai et al. |
| 2018/0279400 A1* | 9/2018 | Faccin ................. H04W 68/005 |
| 2019/0335534 A1* | 10/2019 | Atarius ................. H04L 65/1016 |
| 2020/0245292 A1 | 7/2020 | Huang et al. |

FOREIGN PATENT DOCUMENTS

| | | |
|---|---|---|
| KR | 10-2011-0036464 A | 4/2011 |
| KR | 10-2013-0066531 A | 6/2013 |
| WO | 2012/080377 A1 | 6/2012 |
| WO | 2016077151 A1 | 5/2016 |
| WO | 2017/136078 A1 | 8/2017 |
| WO | 2018/171012 A1 | 9/2018 |
| WO | 2021/015502 A1 | 1/2021 |

OTHER PUBLICATIONS

Examination report dated Nov. 2, 2021, in connection with Indian Application No. 201941014220, 6 pages.
International Search Report dated Jul. 20, 2020 in connection with International Patent Application No. PCT/KR2020/004849, 3 pages.
Written Opinion of the International Searching Authority dated Jul. 20, 2020 in connection with International Patent Application No. PCT/KR2020/004849, 6 pages.
Intel et al., "Paging cause introduction", Change Request, SA WG2 Meeting #129-Bis, Nov. 26-30, 2018, S2-1812346, 8 pages.
International Search Report dated Jul. 17, 2020 in connection with International Patent Application No. PCT/KR2020/004811, 4 pages.
Intellectual Property India, "Examination report under sections 12 &13 of the Patents Act," issued Nov. 17, 2021, in connection with Indian Patent Application No. 202042015019, 6 pages.
Final Office Action dated Mar. 29, 2024, in connection with U.S. Appl. No. 17/594,251, 13 pages.
Office Action issued Jul. 19, 2024, in connection with U.S. Appl. No. 17/594,251, 14 pages.
Communication pursuant to Article 94(3) EPC dated Sep. 20, 2024, in connection with European Patent Application No. 20786925.6, 7 pages.

* cited by examiner

[Fig. 1A]
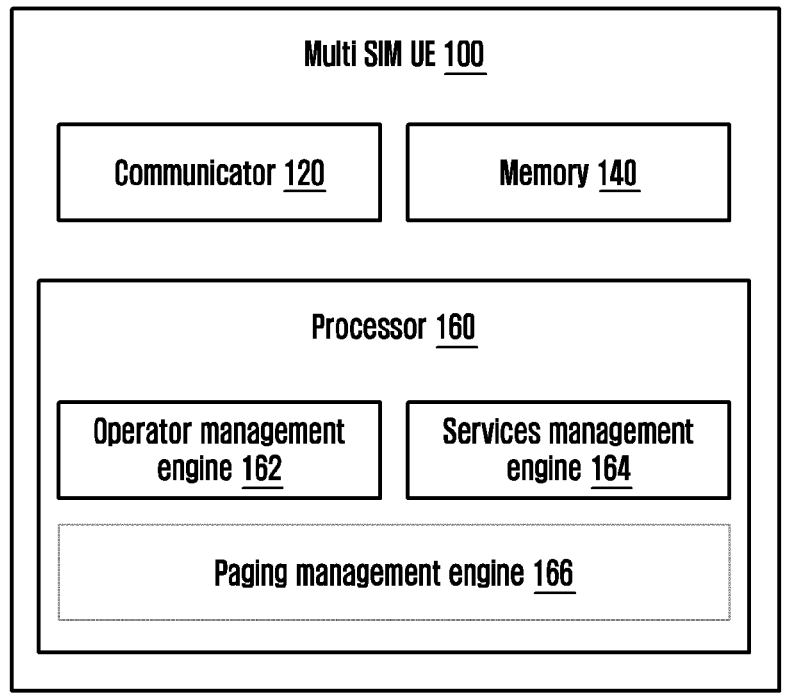
[Fig. 1B]
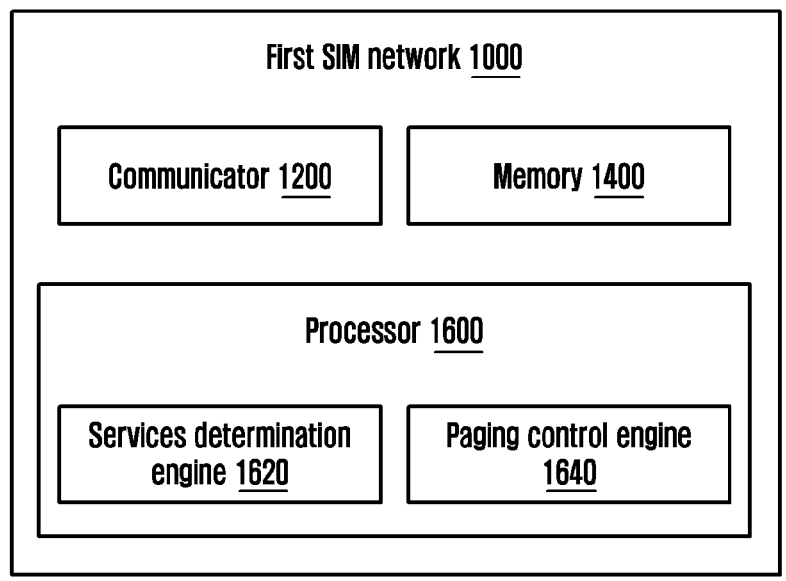

[Fig. 2A]
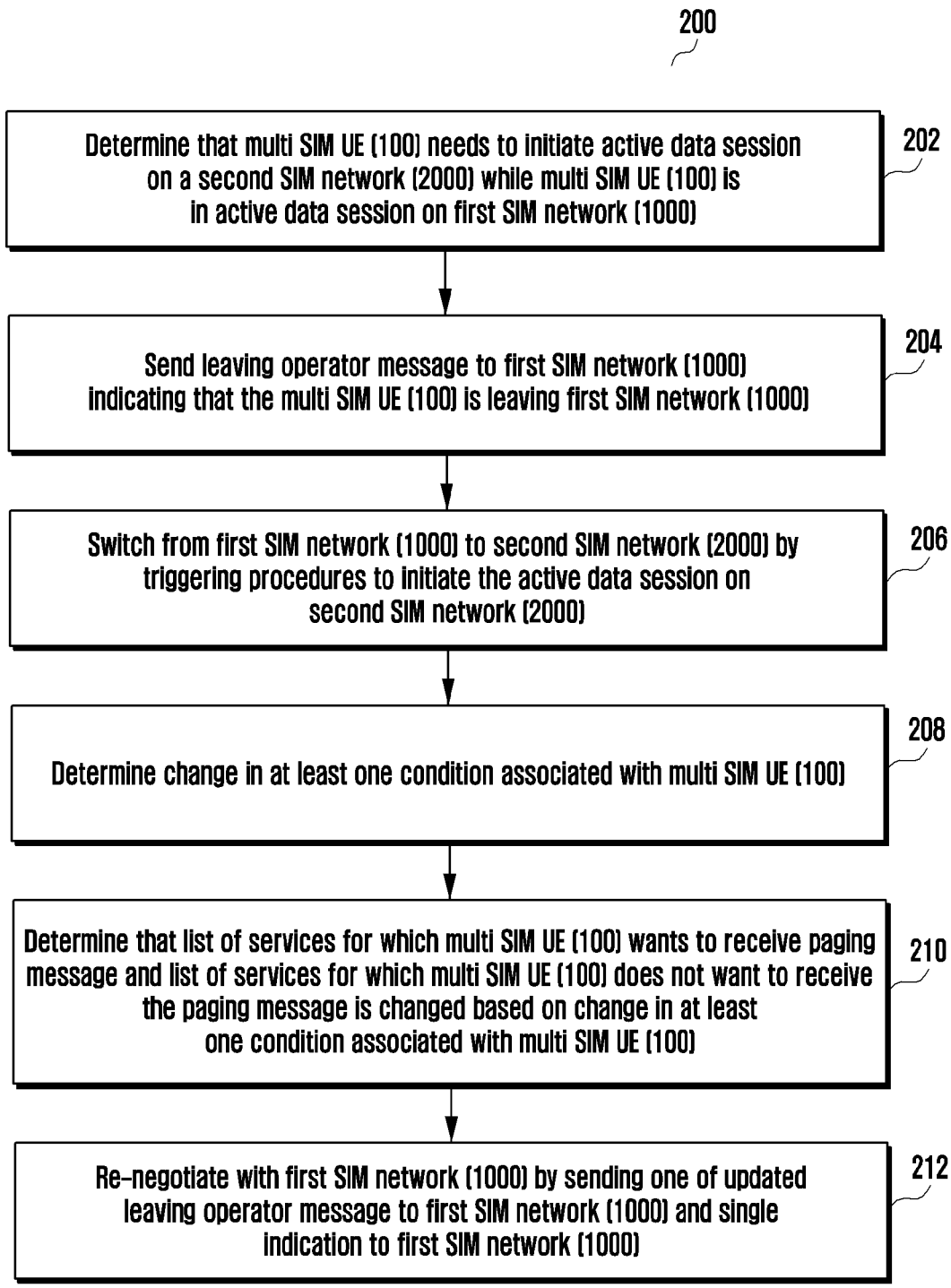

[Fig. 2B]
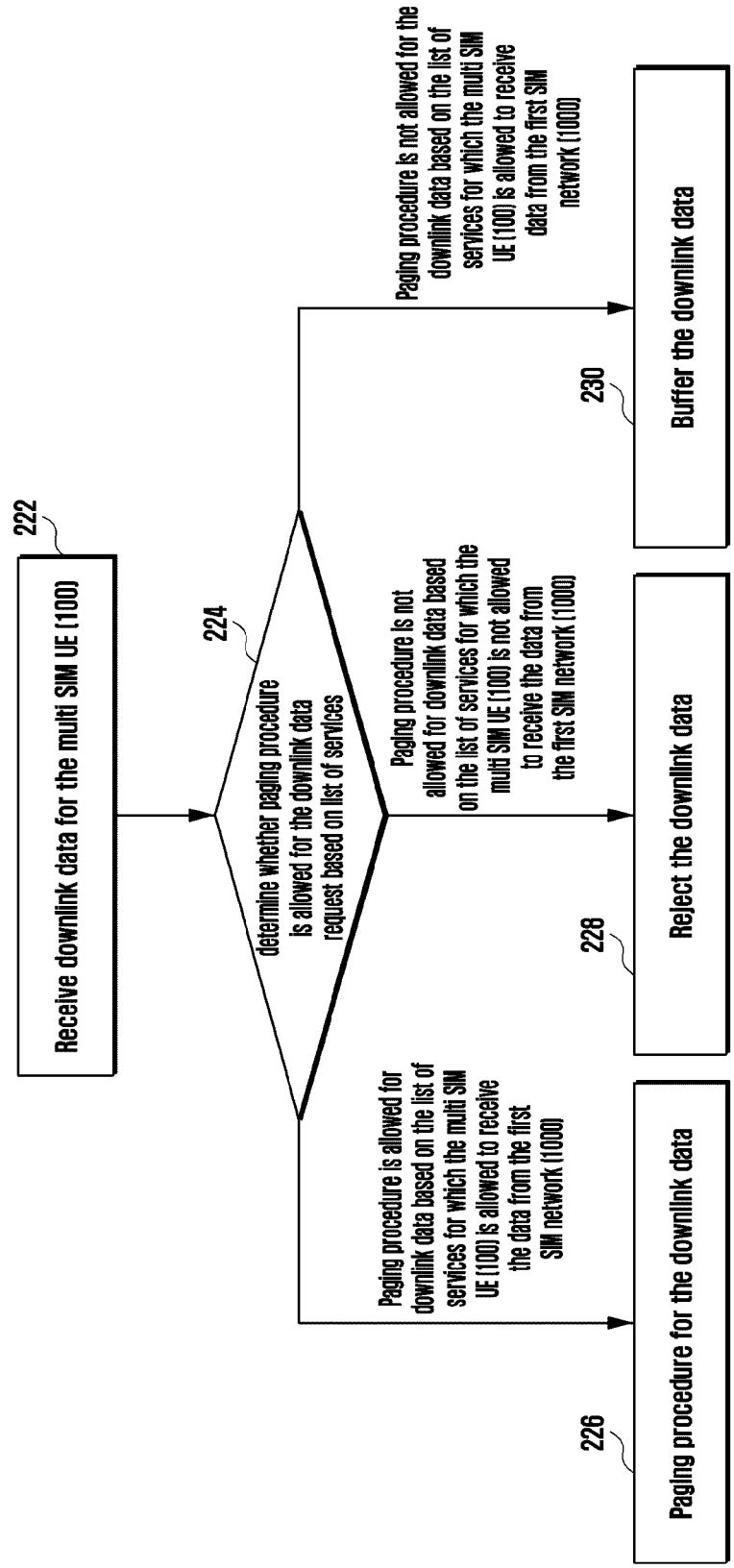

[Fig. 2C]
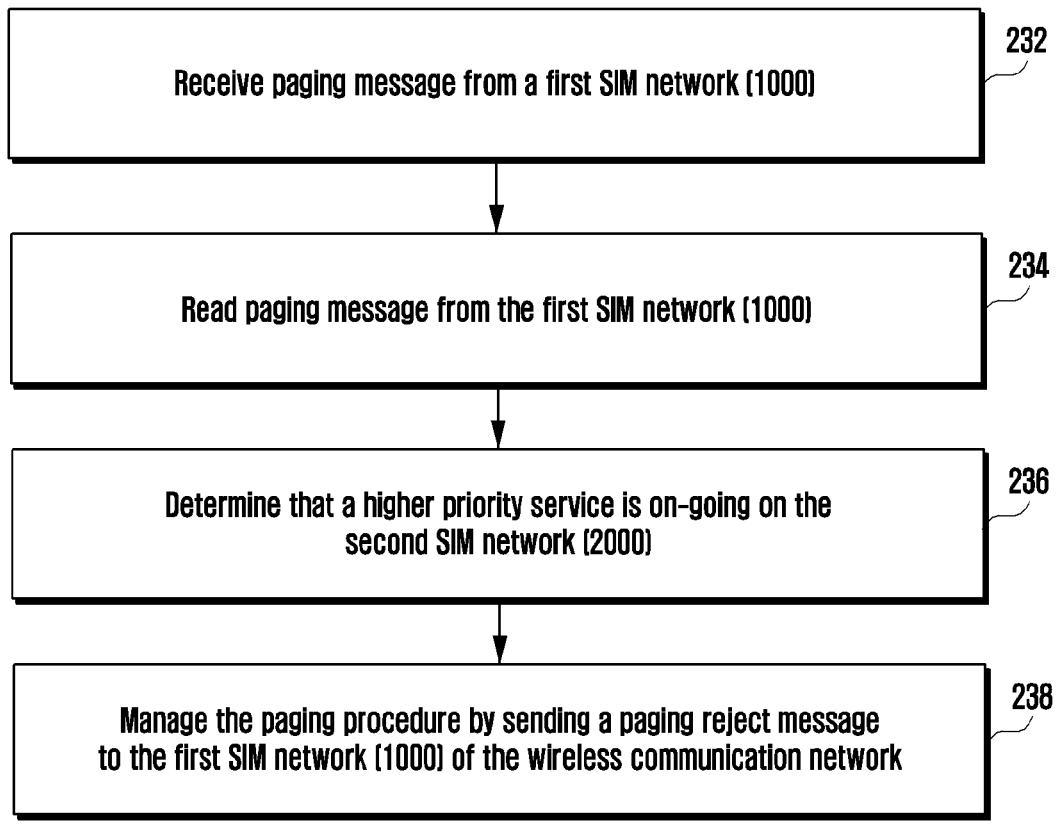

[Fig. 2D]
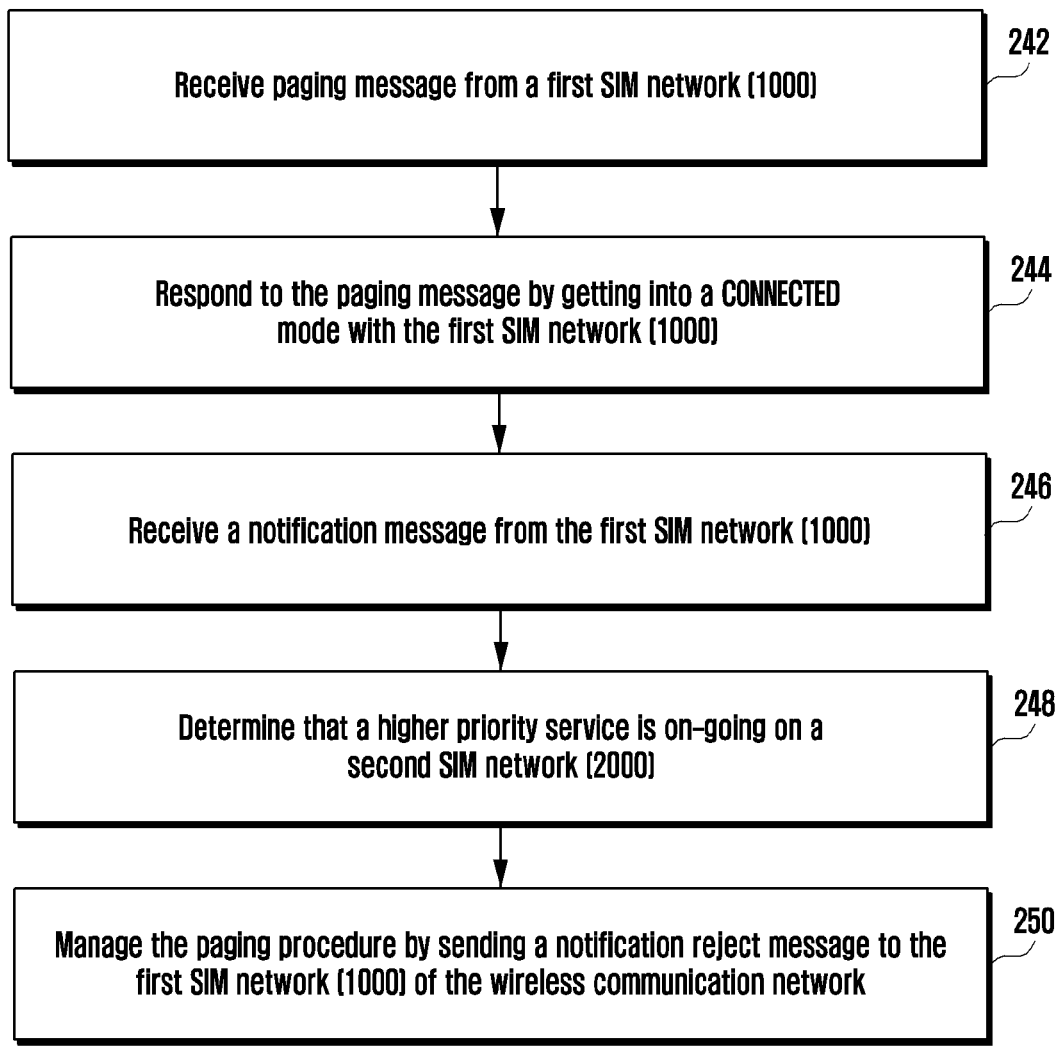

[Fig. 3A]
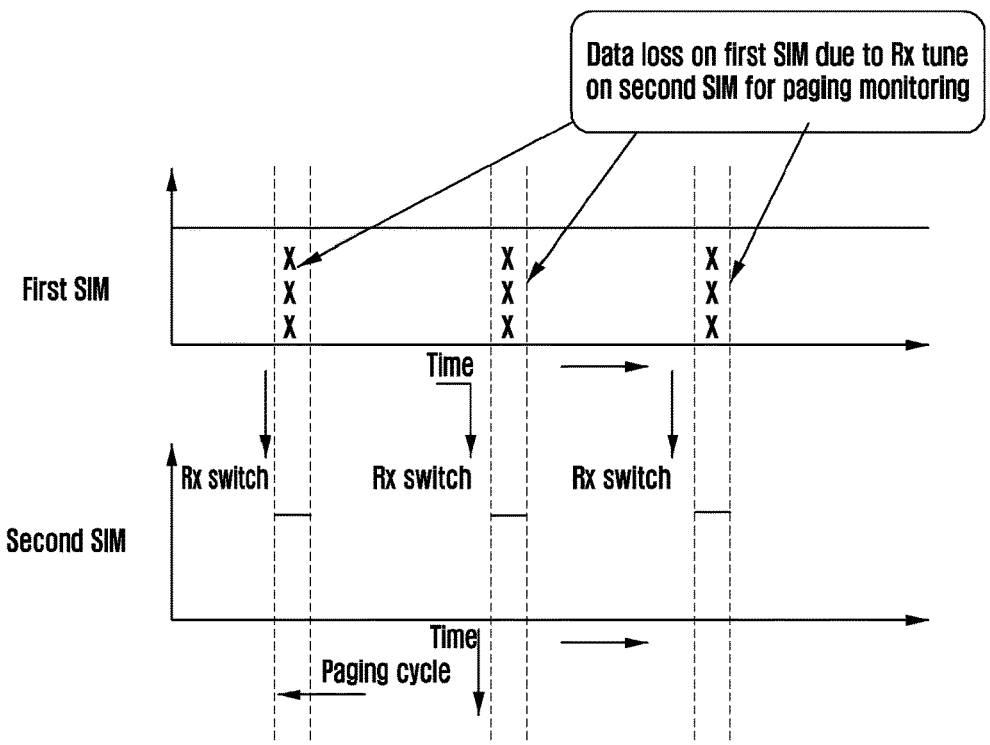
[Fig. 3B]
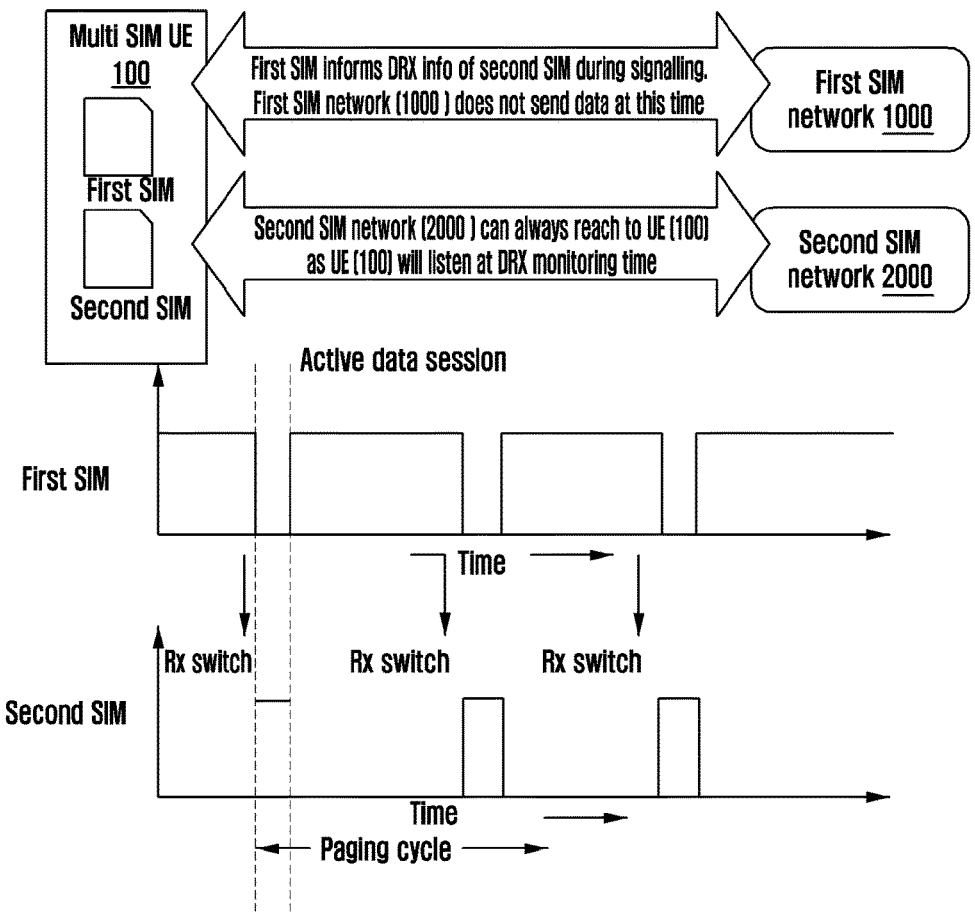

[Fig. 3C]
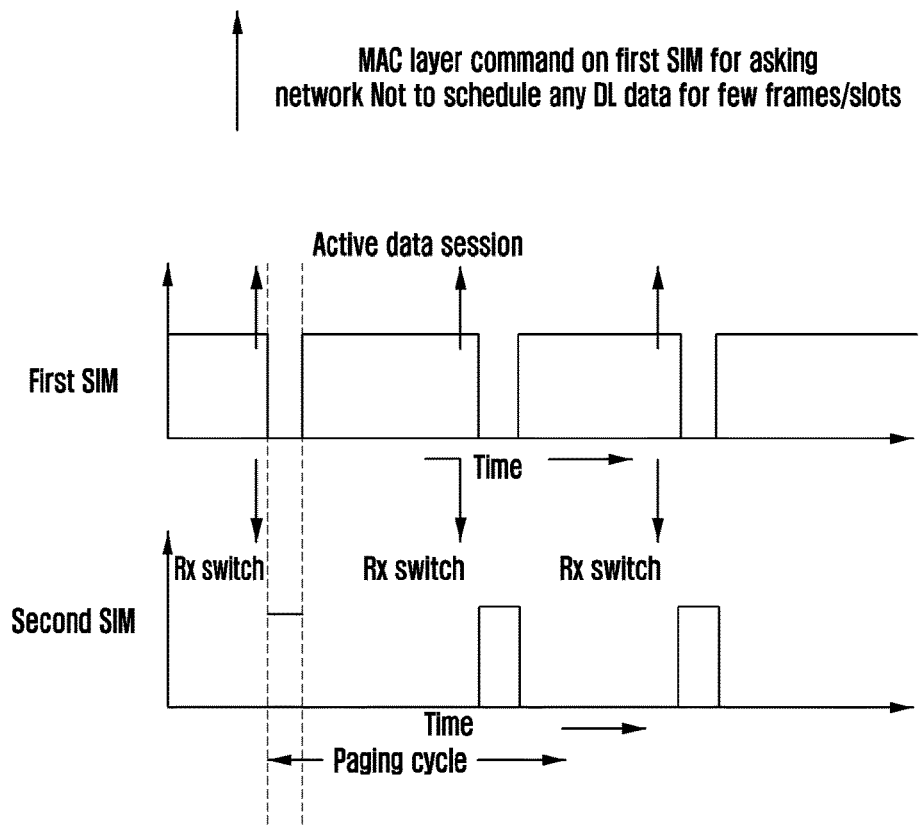
[Fig. 4]
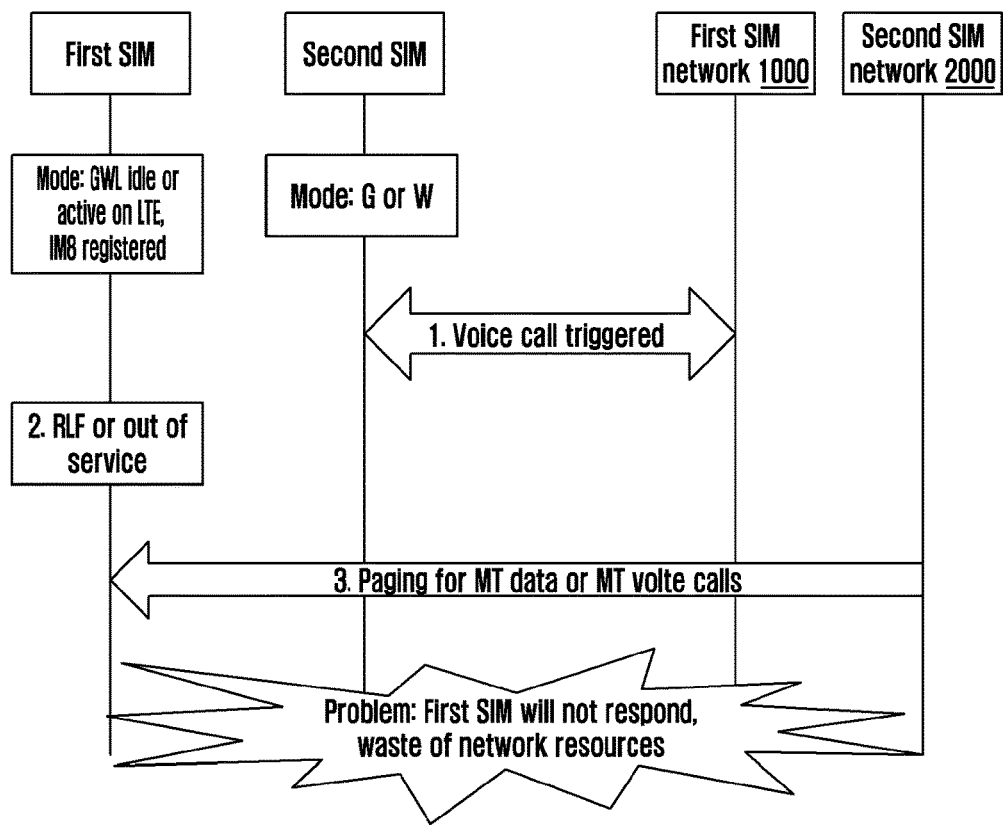

[Fig. 5]
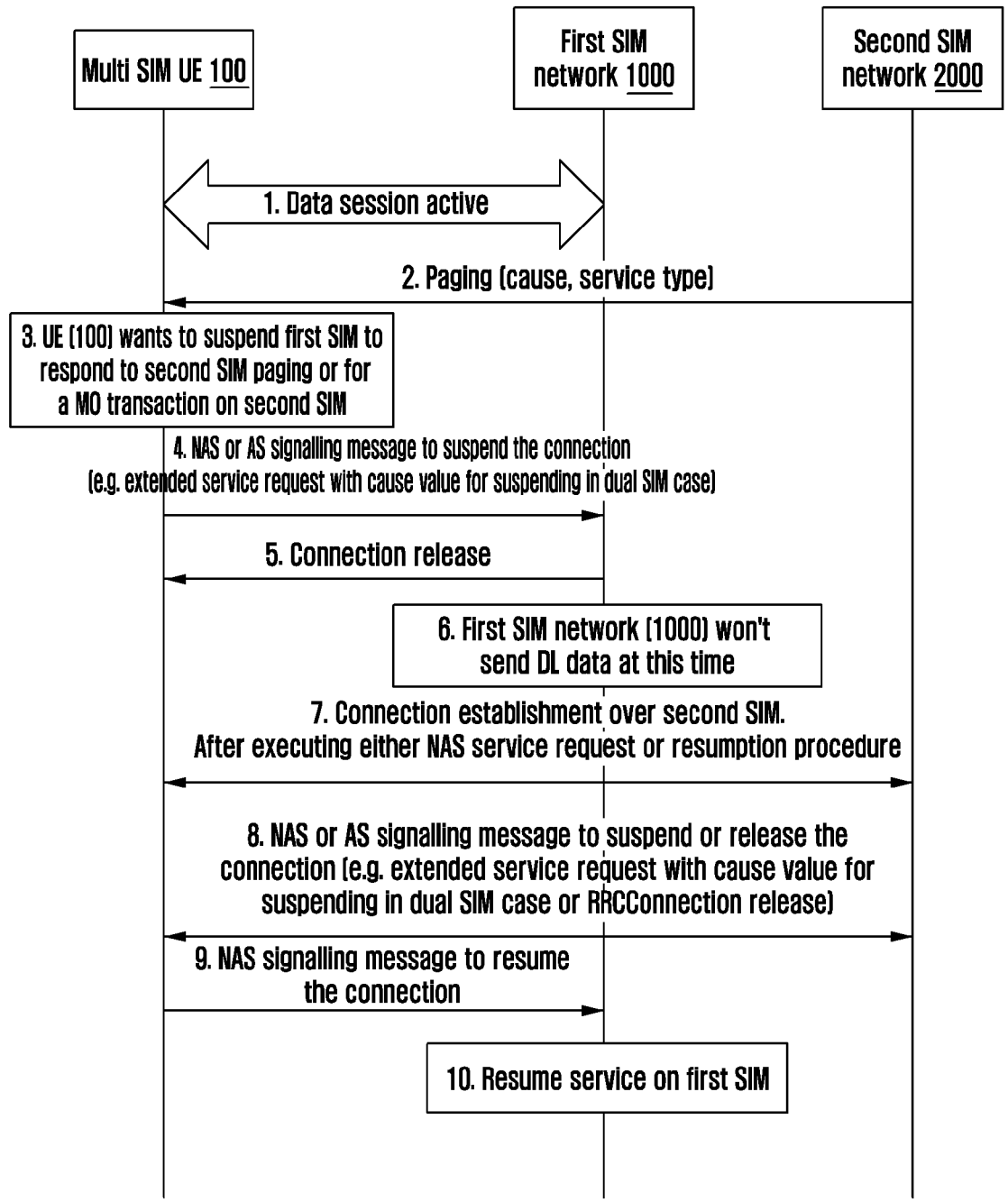

[Fig. 6]
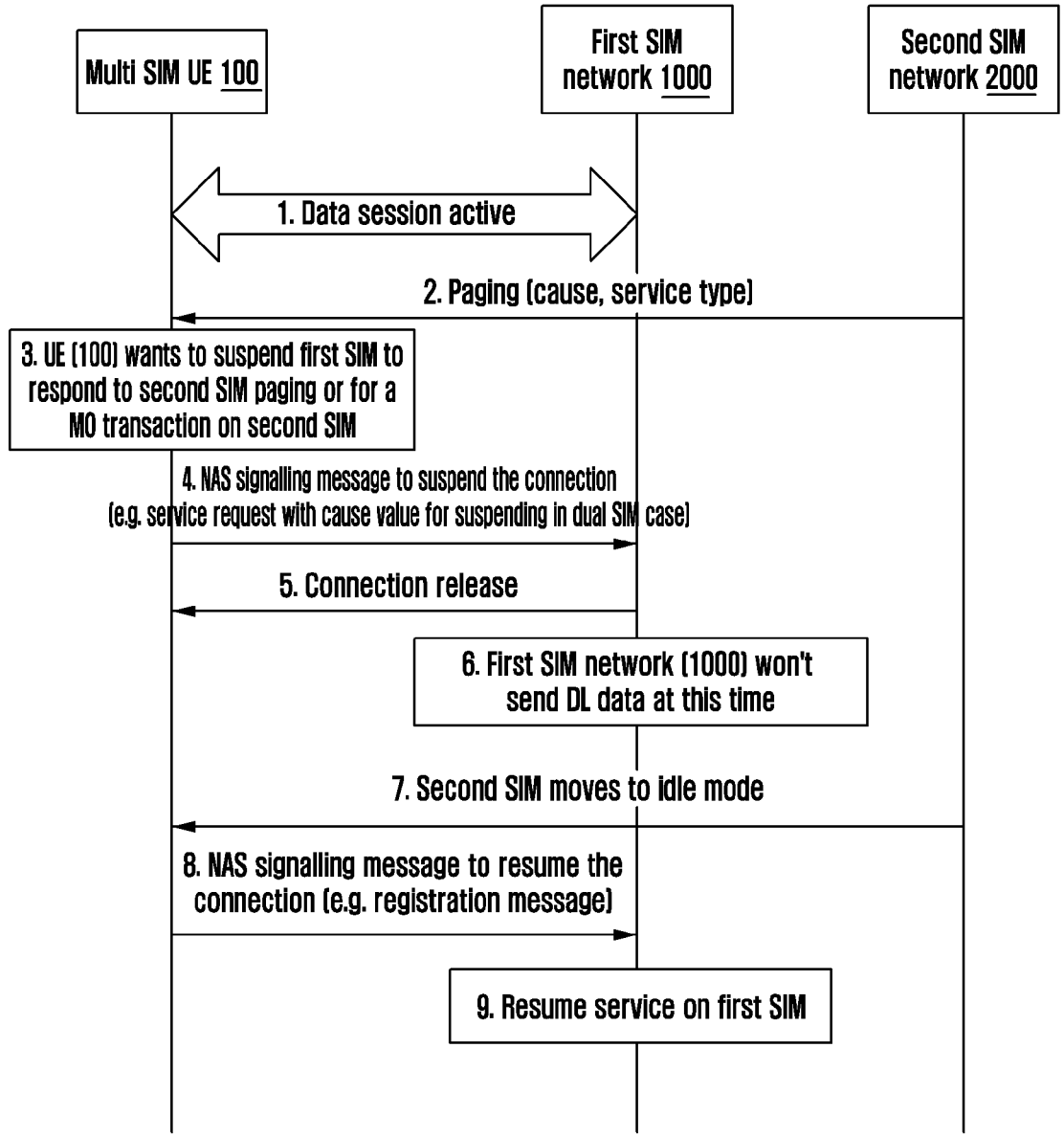

[Fig. 7]
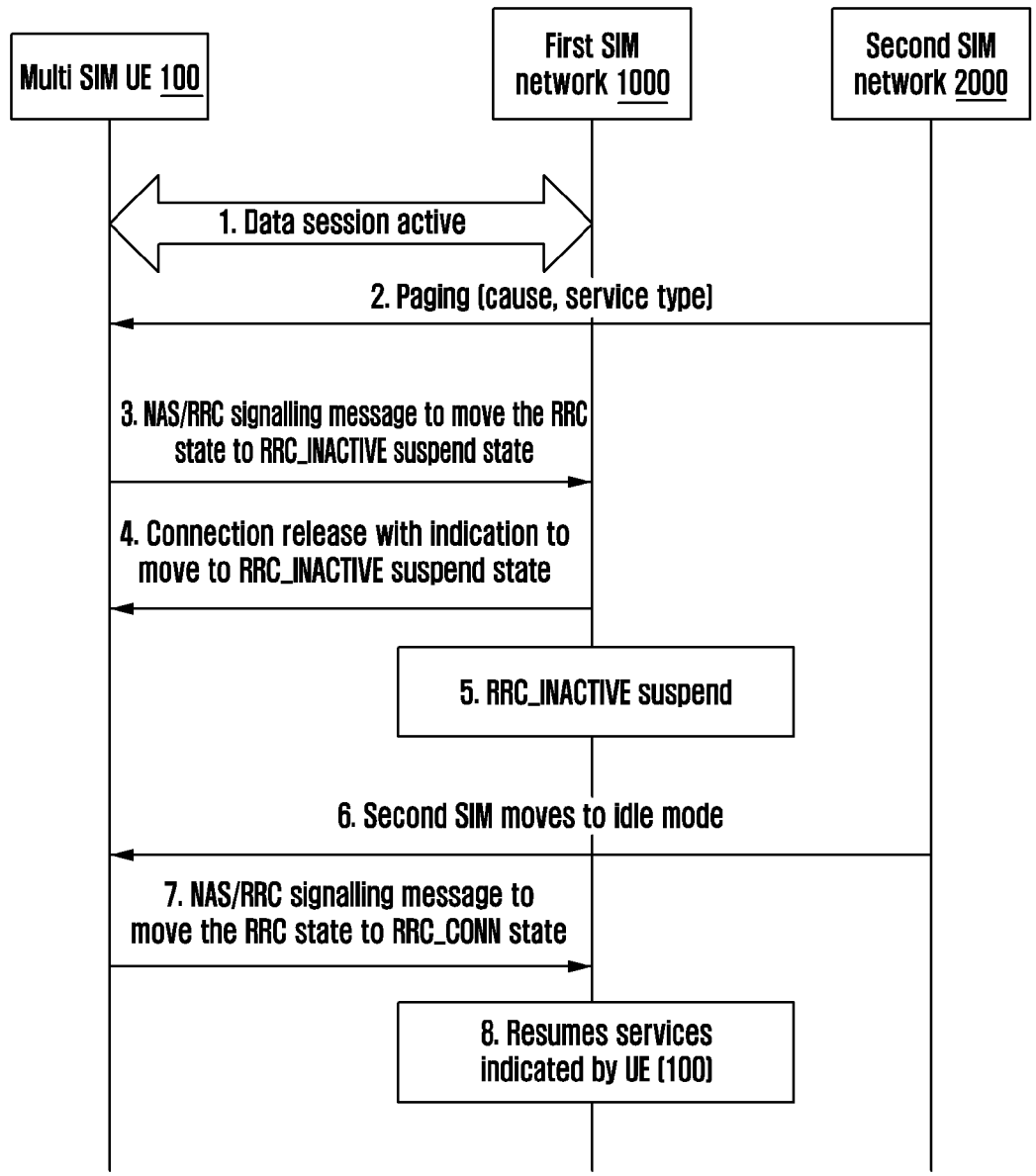

[Fig. 8]
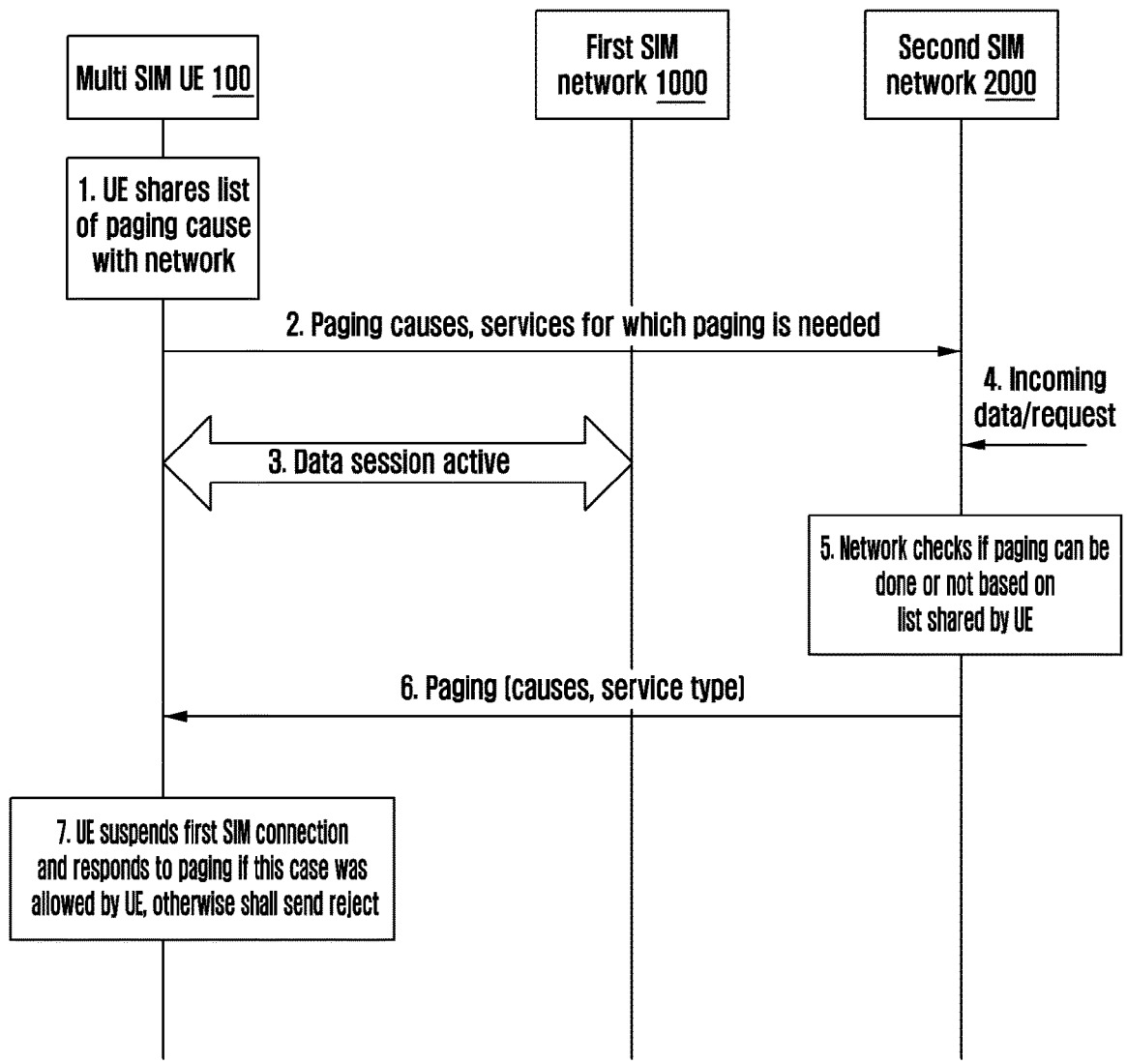

[Fig. 9]
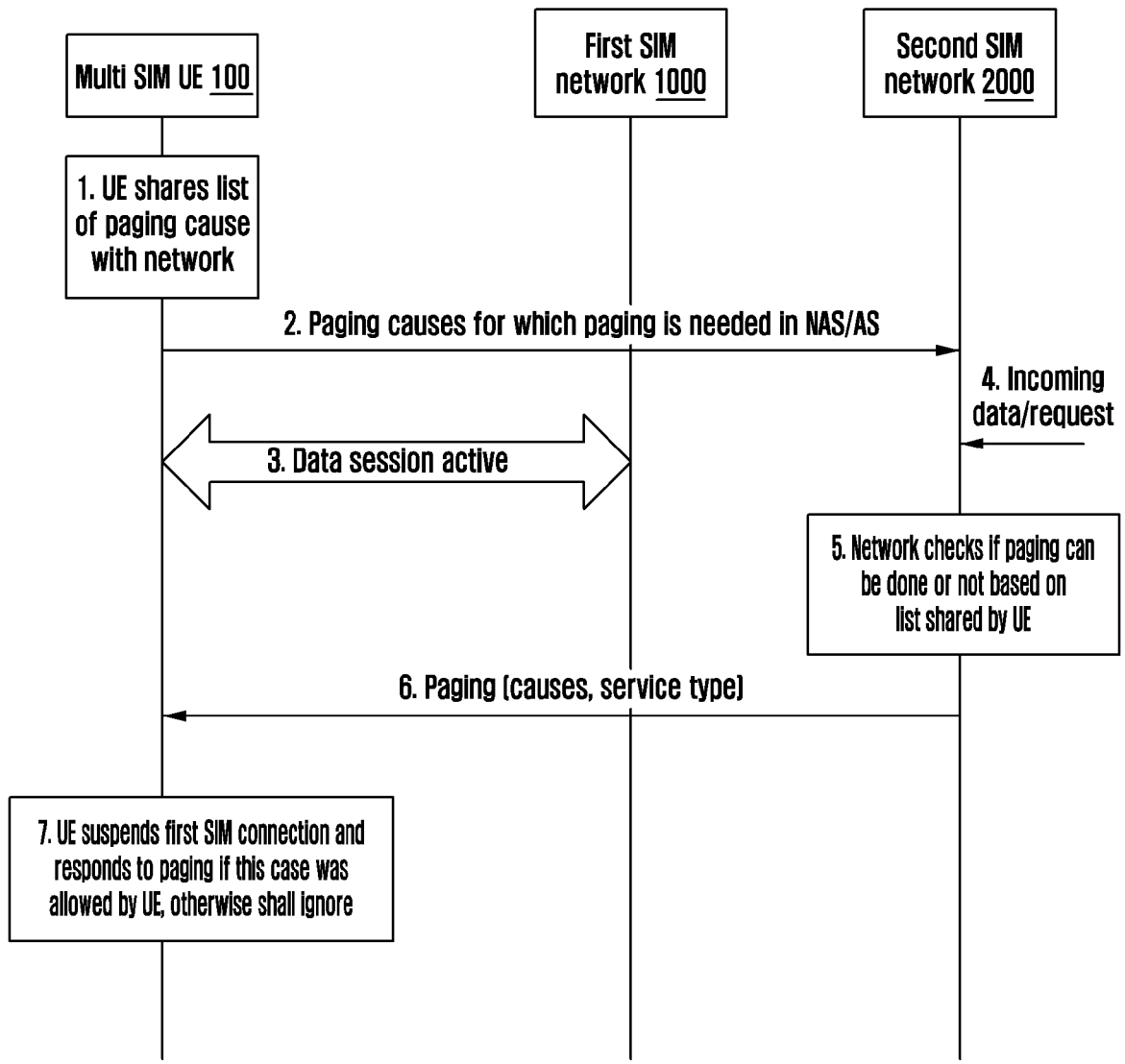

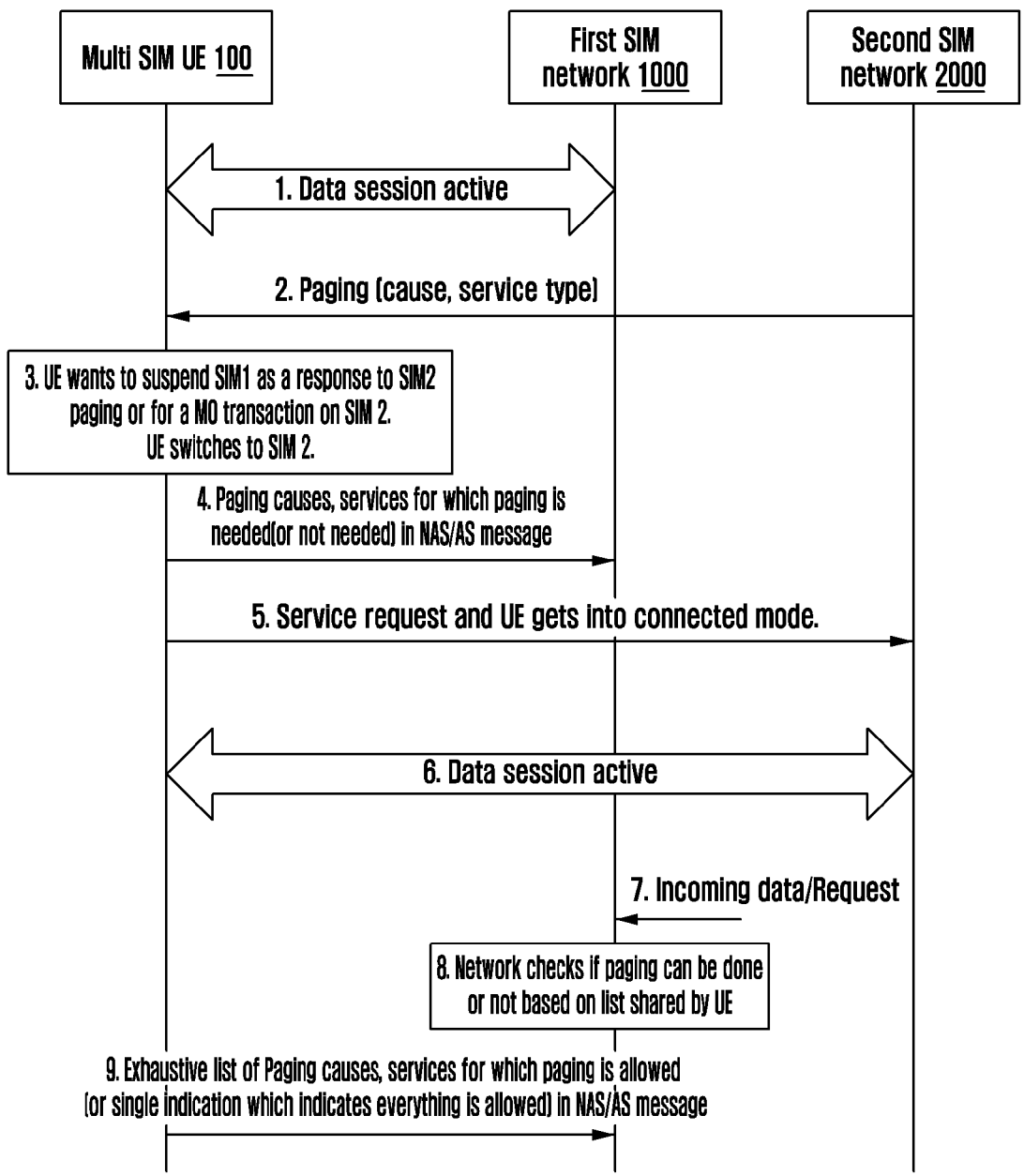
[Fig. 10]

[Fig. 11]
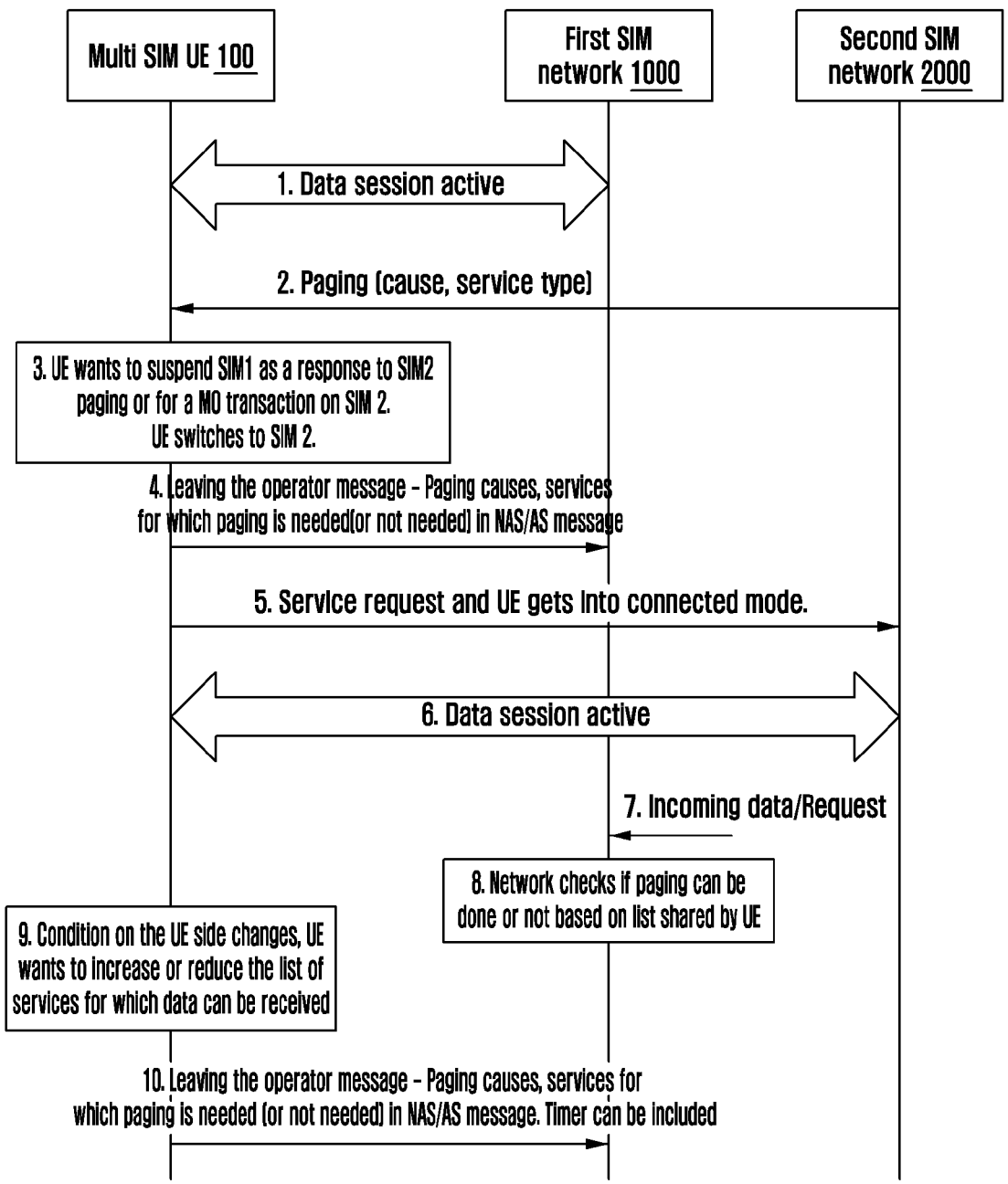

[Fig. 12]
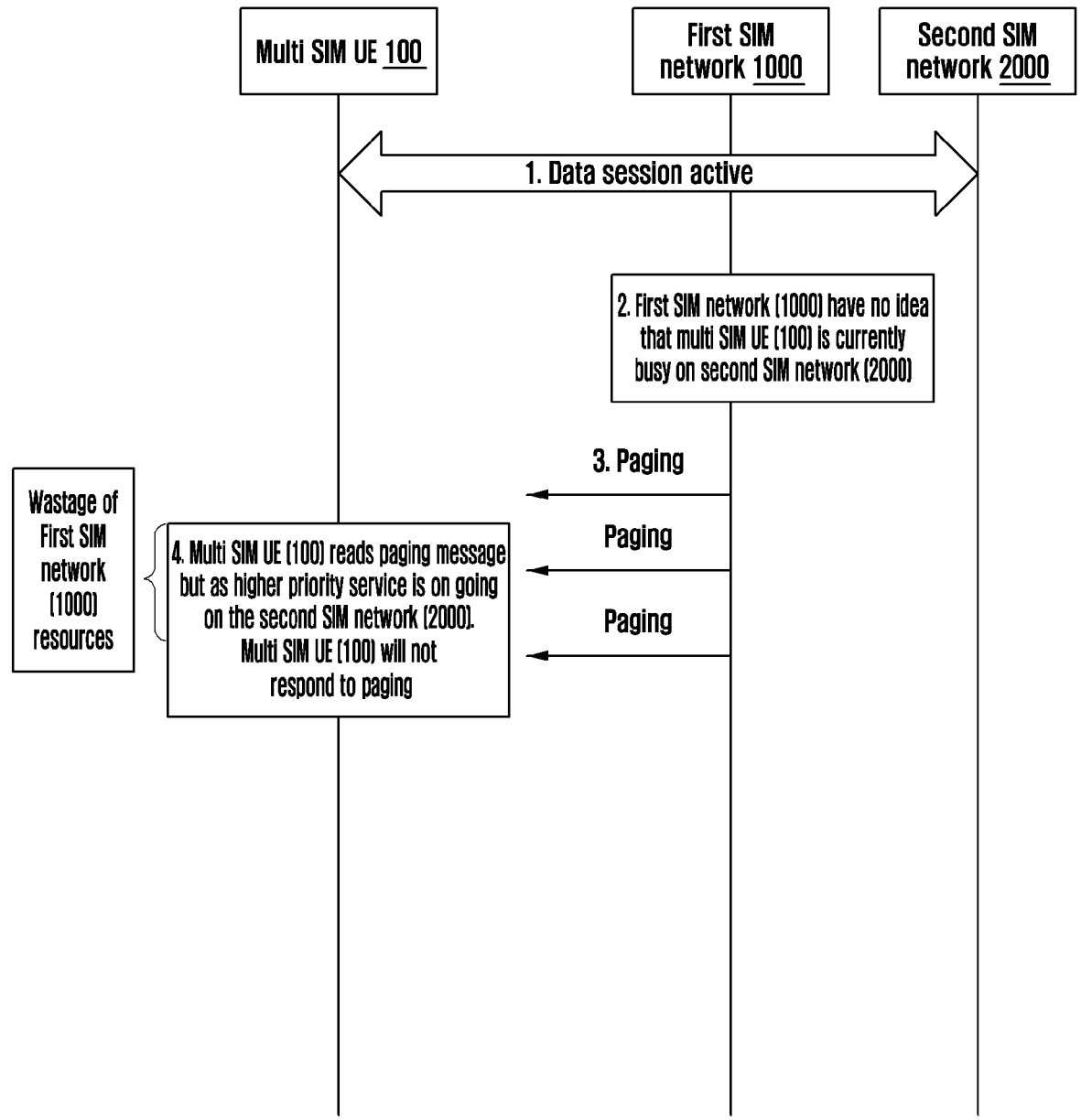

[Fig. 13]
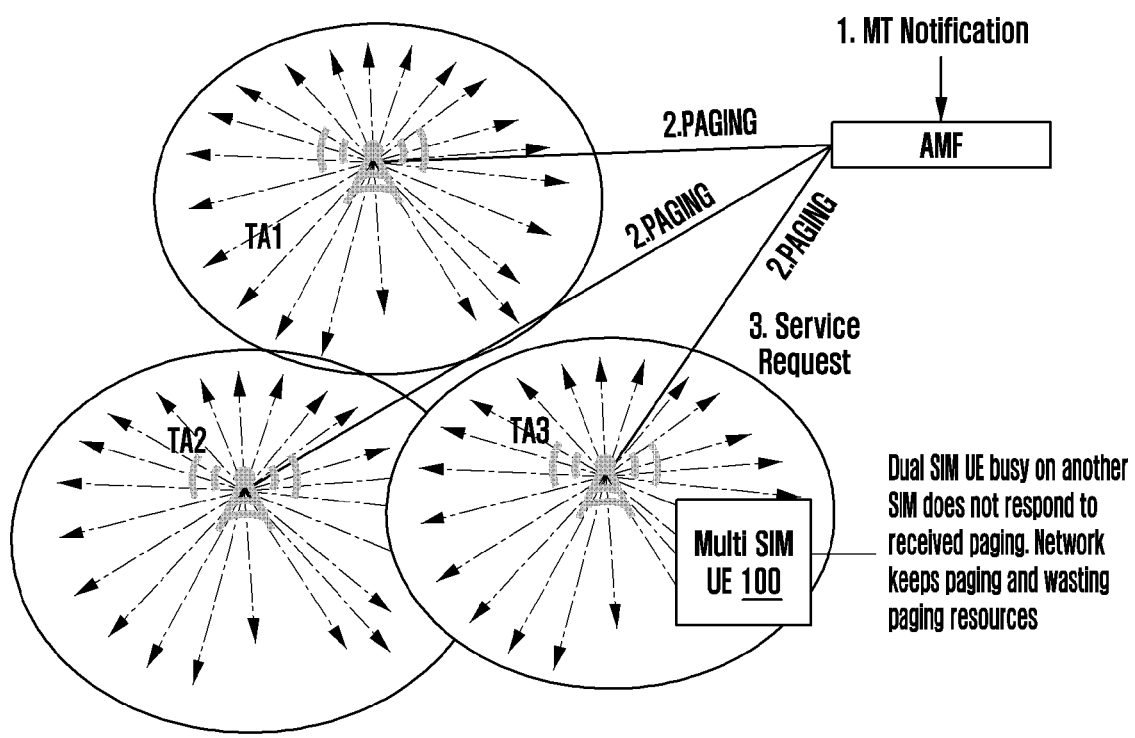

[Fig. 14]
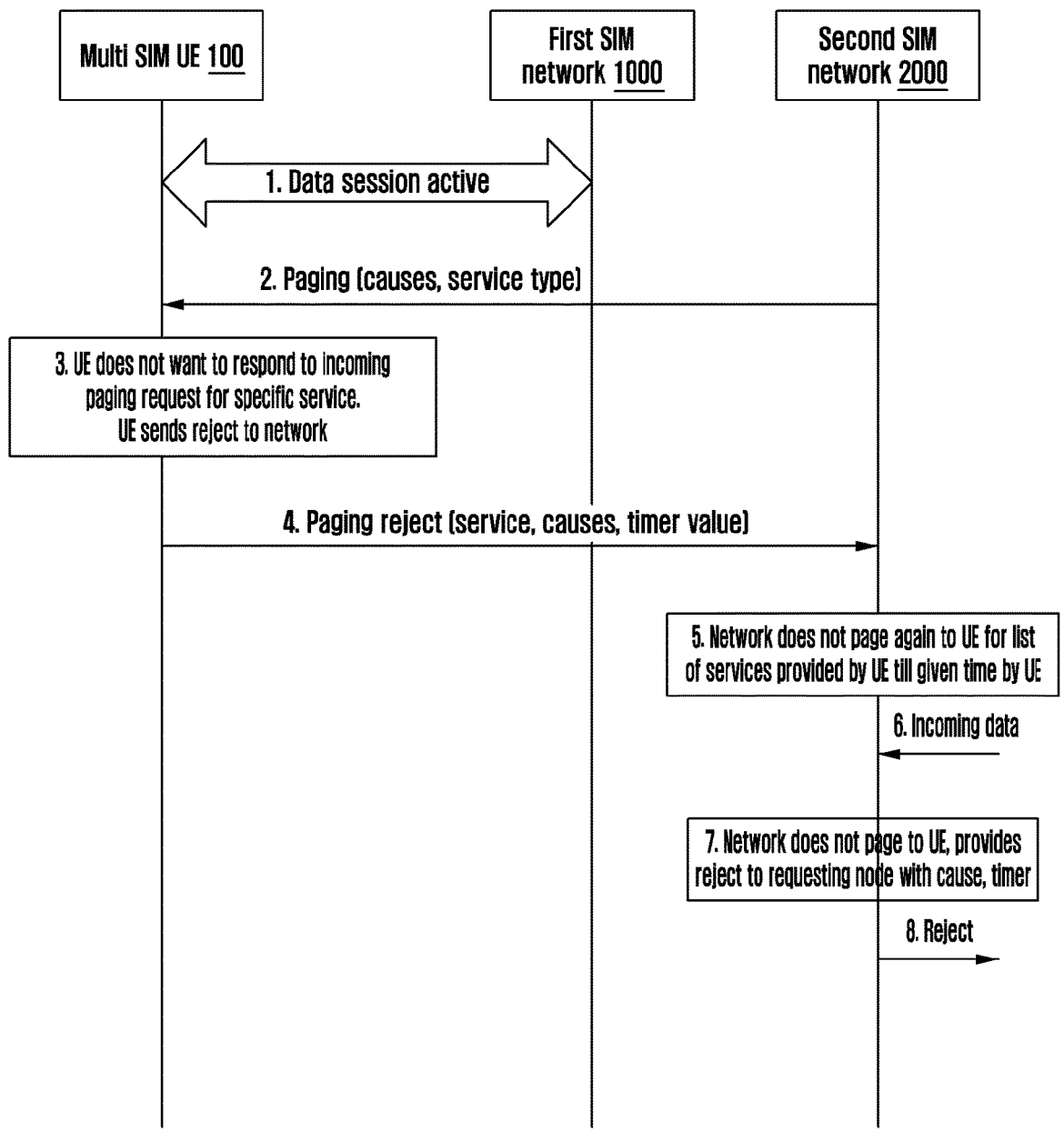

[Fig. 15]
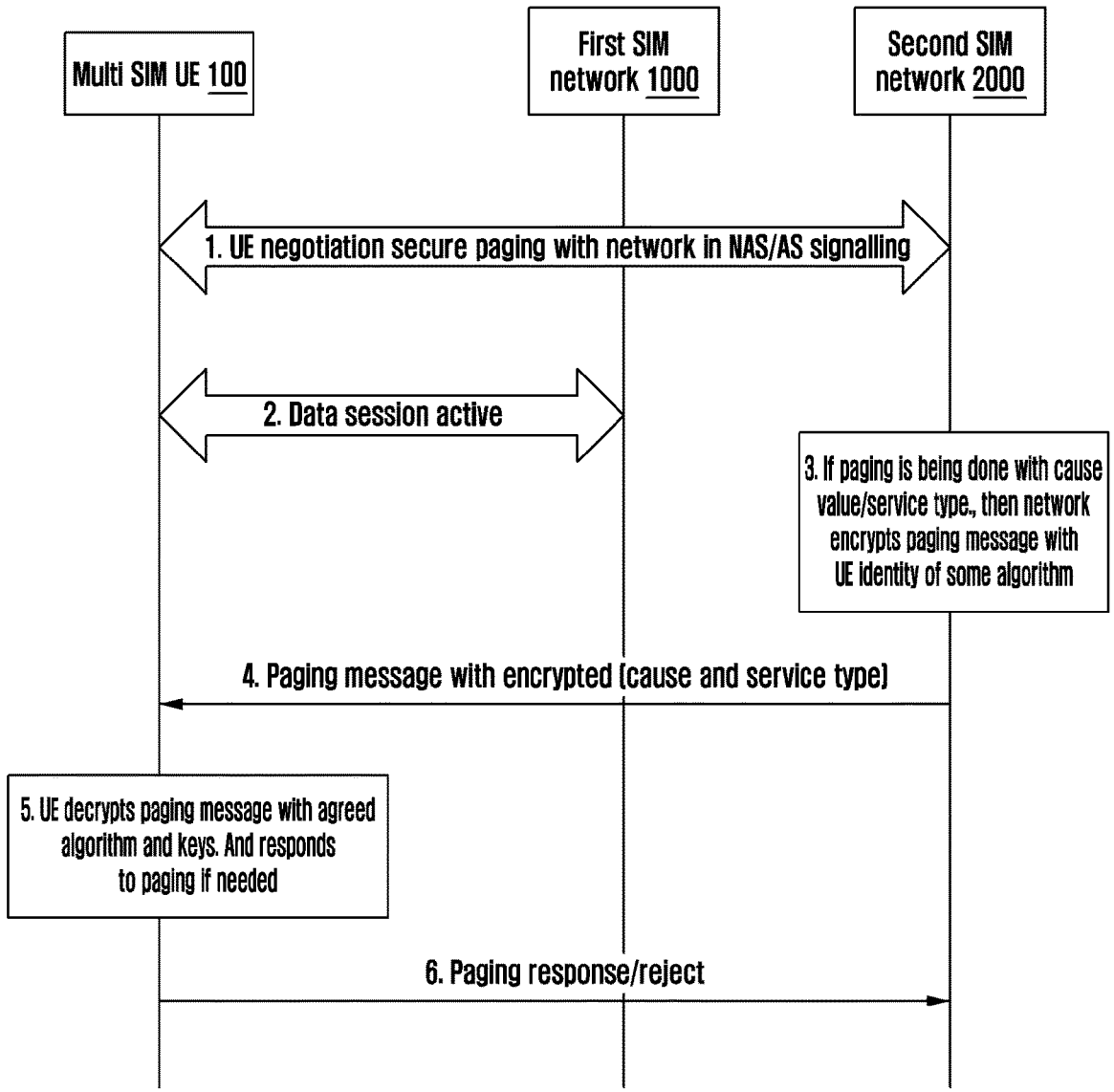

[Fig. 16]
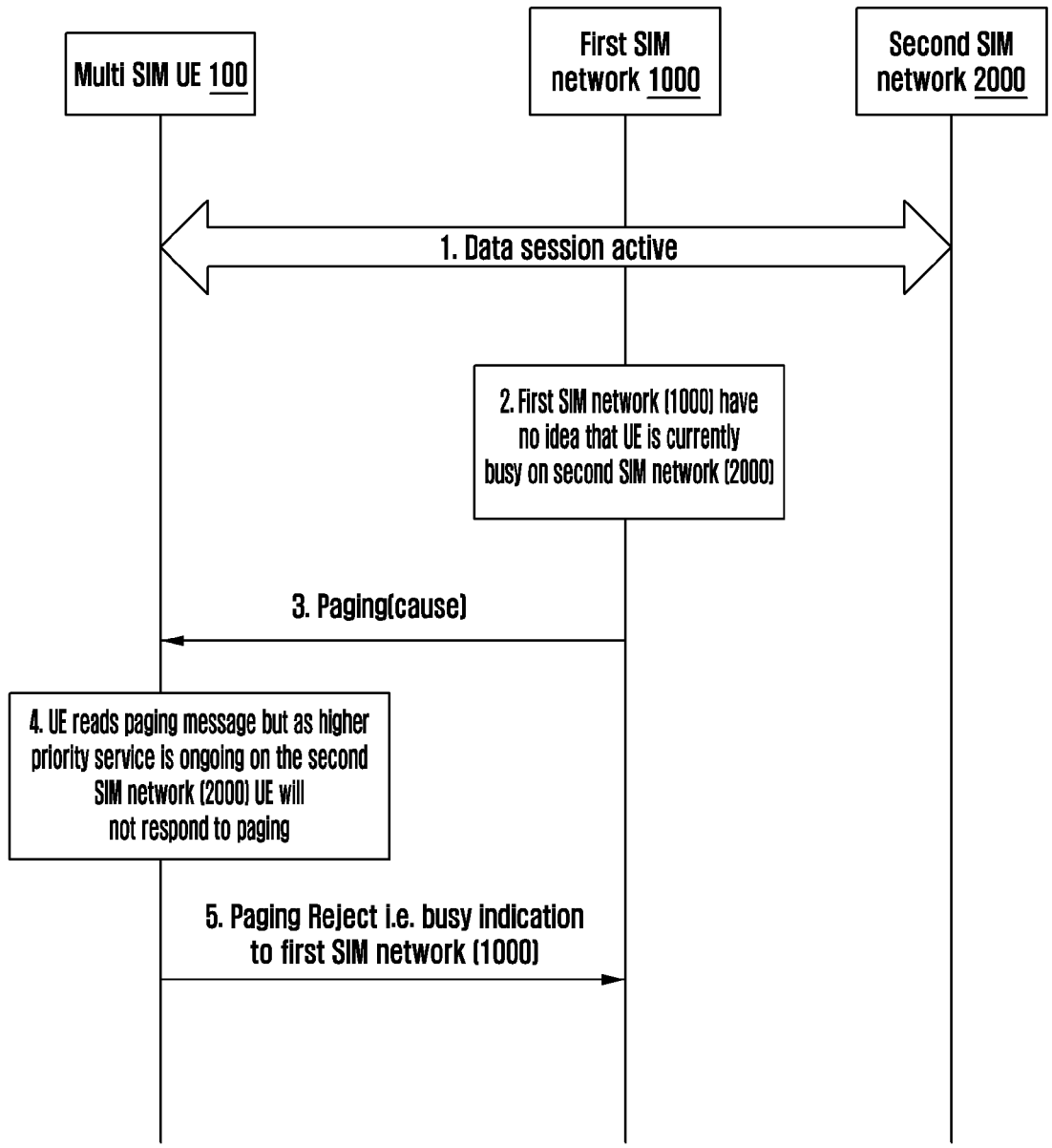

[Fig. 17]
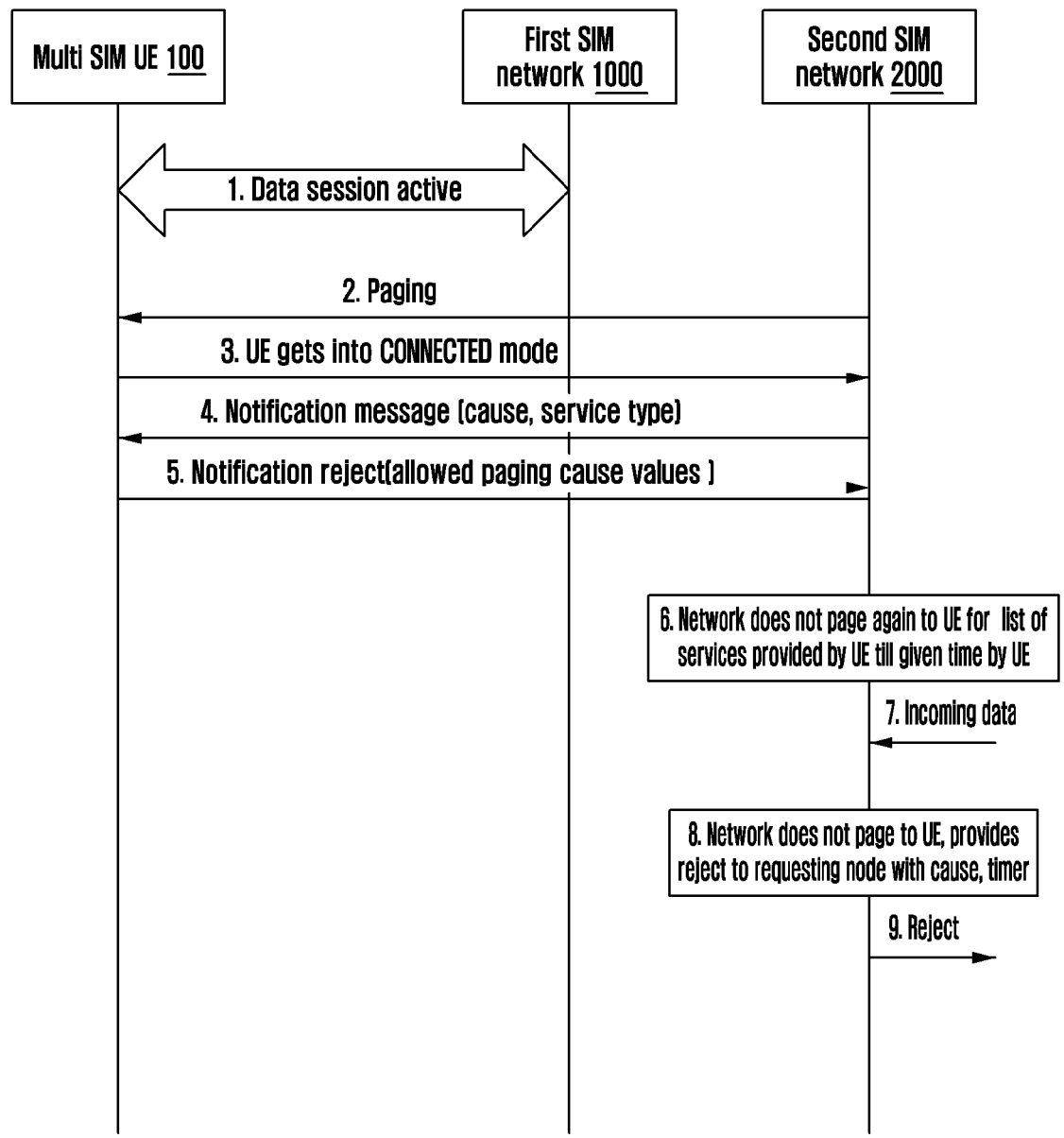

METHOD AND SYSTEM OF UE FOR SWITCHING BETWEEN PLURALITY OF SIM NETWORKS

CROSS-REFERENCE TO RELATED APPLICATIONS

This application is a 371 of International Application No. PCT/KR2020/004849 filed on Apr. 9, 2020, which claims priority to India Patent Application No. 201941014220 filed on Apr. 9, 2019, and India Patent Application No. 201941014220 filed on Apr. 4, 2020, the disclosures of which are herein incorporated by reference in their entirety.

BACKGROUND

1. Field

The embodiments herein relate to wireless communication, and more particularly, to method and system of user equipment (UE) for switching between plurality of subscriber identity module (SIM) networks in wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Multi-SIM wireless devices are popular in recent times because of the versatility that they provide, particularly in jurisdictions with multiple service providers. For example, a dual-SIM smart phone allows a user to implement two different plans or service providers on the dual-SIM smart phone, each with separate telephone numbers and bills (e.g., a business account/number and a personal account/number). Also, during travel, users can obtain local SIM cards and pay local call rates in the destination country. By using multiple SIMS, a user can take advantage of different pricing plans, and save on mobile data usage. Thus, the dual-SIM smart phone effectively provides users with two phones, without the need to carry two separate devices.

However, an operator of a first SIM and an operator of a second SIM have absolutely no idea that the device is the dual-SIM smart phone. When the dual-SIM smart phone is active on the first SIM, the second SIM is not aware of the same and continues paging the dual-SIM smart phone continuously. Since, the dual-SIM smart phone behaves as two different devices in a system, the system has created loss of network resources and the dual-SIM smart phone's battery consumption.

Further, there are limitations due to user equipment (UE) hardware like the UE can be single RX or single Tx that is the UE can have single Rx and Single Tx. Then the UE may not be able to communicate with SIM networks associated with the two SIMS of the dual SIM at the same time. However there are UE's in the market which can have multiple transmitters and receivers, due to this capability they can communicate with multiple operators at the same time. Such UEs can behave as a multiple UEs in the system. The major limitation of such multiple transmitter and receivers UEs is the cost factor involved due to higher hardware requirement.

The above information is presented as background information only to help the reader to understand the present invention. Applicants have made no determination and make no assertion as to whether any of the above might be applicable as prior art with regard to the present application.

The principal object of the embodiments herein is to provide a method and user equipment (UE) for switching between plurality of subscriber identity module (SIM) networks in wireless communication network.

Another object of the embodiments herein is to determine that the multi SIM UE needs to initiate an active data session on a second SIM network while the multi SIM UE is in an active data session on a first SIM network based on one of a paging message received by the multi SIM UE from the second SIM network and at least one mobile-originated (MO) activity which needs to be delivered using the second SIM network.

Another object of the embodiments herein is to send a leaving operator message to the first SIM network indicating that the multi SIM UE (100) is leaving the first SIM network.

Another object of the embodiments herein is to switch from the first SIM network to the second SIM network by triggering procedures to initiate the active data session on the second SIM network.

Another object of the embodiments herein is to determine that a higher priority service is on-going on the second SIM network.

Another object of the embodiments herein is to manage paging procedure by sending a paging reject message to the first SIM network of the wireless communication network.

SUMMARY

In an embodiment, the leaving operator message comprises at least one of: a list of services for which the multi SIM UE (100) wishes to receive the paging message from the first SIM network (1000) and a list of services for which the multi SIM UE (100) does not wish to receive the paging message from the first SIM network (1000).

In an embodiment, at least one of: the list of services for which the multi SIM UE (100) wishes to receive the paging message from the first SIM network (1000) and the list of services for which the multi SIM UE (100) does not wish to receive the paging message from the first SIM network (1000) is at least one of protocol data unit (PDU) session identifier (ID), slice ID, quality of service (QOS), QoS Class Identifier (QCI), paging cause, service type, Evolved Packet System (EPS) bearer ID, Data Network Name (DNN), Access Point Name (APN), Dedicated Radio Bearer (DRB) ID, QoS Flow ID (QFI), Traffic flow templates (TFT), Application ID, UE Route selection policy identifier, establishment cause, access type and access category.

In an embodiment, the leaving operator message is one of a NAS signalling message and an AS signalling message.

In an embodiment, the leaving operator message comprises a timer indicating a duration during which the multi SIM UE (100) does not accept downlink data from the first SIM network (1000) except for the list of services indicated as allowed by the multi SIM UE (100).

In an embodiment, the leaving operator message can be sent to the first SIM network (1000) and the multi SIM UE (100) can immediately move to the second SIM network (2000); without waiting for a response message from the first SIM network (1000) like RRC connection release, NAS response message or AS response message.

In an embodiment, further comprising receiving, by the first SIM network (1000), downlink data for the multi SIM UE (100) and determining, by the first SIM network (1000), whether a paging procedure is allowed for the downlink data request based on at least one of: a list of services, the multi SIM UE (100) indicated is allowed to receive data from the first SIM network (1000) and a list of services, the multi SIM UE (100) indicated is allowed to receive data from the first SIM network (1000). Further, the method includes performing, by the first SIM network (1000), one of: paging procedure for the downlink data, in response to determining that the paging procedure is allowed for the downlink data based on the list of services for which the multi SIM UE (100) indicated is allowed to receive the data from the first SIM network (1000), rejecting the downlink data, in response to determining that the paging procedure is not allowed for the downlink data based on the list of services for which the multi SIM UE (100) indicated is not allowed to receive the data from the first SIM network (1000), and buffering the downlink data, in response to determining that the paging procedure is not allowed for the downlink data based on the list of services for which the multi SIM UE (100) indicated is allowed to receive data from the first SIM network (1000).

In an embodiment, determining, by the multi SIM UE (100), a change in at least one condition associated with the multi SIM UE (100) and determining, by the multi SIM UE (100), that the list of services for which the multi SIM UE (100) will receive the data from the first SIM network (1000) is changed based on the change in at least one condition associated with the multi SIM UE (100). Further, the method includes re-negotiating, by the multi SIM UE (100), with the first SIM network (1000) by sending one of an updated leaving operator message to the first SIM network (1000) and a single indication to the first SIM network (1000).

In an embodiment, the updated leaving operator message comprises an updated list of services for which the multi SIM UE (100) will receive the data from the first SIM network (1000) based on the change in at least one condition associated with the multi SIM UE (100).

In an embodiment, the updated list of services for which the multi SIM UE (100) will receive the data from the first SIM network (1000) is one of: delta information and an exhaustive list.

In an embodiment, the single indication to the first SIM network (1000) indicates one of: the first SIM network (1000) is allowed to page the multi SIM UE (100) for any service and the first SIM network (1000) is not allowed to page the multi SIM UE (100) for any service.

In an embodiment, the single indication to the first SIM network (1000) is one of a NAS signalling message and an AS signalling message.

In an embodiment, when the multi SIM UE (100) sends the leaving the operator message or the paging reject message with list of services, the multi SIM UE (100) wants to receive or with list of the services the multi SIM UE (100) does not want to receive. The first SIM network (1000) in response can indicate to the multi SIM UE (100) the list of more services then the multi SIM UE (100) requested will be suspended. For example the multi SIM UE (100) may indicate that the multi SIM UE (100) does not want to receive services A, B and C, in response the first SIM network (1000) may indicate to the multi SIM UE (100) that A, B, C and D services are suspended. The word suspended means the multi SIM UE (100) will not receive paging when downlink data for any of those services are generated (or received) in the first SIM network (1000).

Accordingly, the embodiments herein provide multi SIM user equipment (UE) (100) for switching between a plurality of SIM networks in a wireless communication network. The multi SIM UE (100) includes a memory (140), and a processor (160) coupled with the memory (140). The processor (160) is configured to determine that the multi SIM UE (100) needs to initiate an active data session on a second SIM network (2000) while the multi SIM UE (100) is in an active data session on a first SIM network (1000) based on one of a paging message received by the multi SIM UE (100) from the second SIM network (2000) and at least one mobile-originated (MO) activity which needs to be delivered using the second SIM network (2000). Further, the processor (160) is also configured to send a leaving operator message to the first SIM network (1000) indicating that the multi SIM UE (100) is leaving the first SIM network (1000); and switch from the first SIM network (1000) to the second SIM network (2000) by triggering procedures to initiate the active data session on the second SIM network (2000).

Accordingly, the embodiments herein provide a method for managing paging procedure by multi SIM user equipment (UE) (100) in a wireless communication network. The method includes receiving, by the multi SIM UE (100), a paging message from a first SIM network (1000), where the multi SIM UE (100) is on an active data session on a second SIM network (2000) and reading, by the multi SIM UE (100), the paging message from the first SIM network (1000). Further, the method include determining, by the multi SIM UE (100), that a higher priority service is on-going on the second SIM network (2000) and performing, by the multi SIM UE (100), a RACH procedure and managing, by the multi SIM UE (100), the paging procedure by sending a paging reject message to the first SIM network (1000) of the wireless communication network.

Accordingly, the embodiments herein provide a method for managing paging procedure by a multi SIM user equipment (UE) (100) in a wireless communication network. The method includes receiving, by the multi SIM UE (100), a paging message from a first SIM network (1000), wherein the multi SIM UE (100) is on an active data session on a second SIM network (2000) and responding, by the multi SIM UE (100), to the paging message by getting into a CONNECTED mode with the first SIM network (1000). Further, the method includes receiving, by the multi SIM UE (100), a notification message from the first SIM network (1000), where the notification message comprises a cause for establishing a connection with the first SIM network (1000) and determining, by the multi SIM UE (100), that a higher priority service is on-going on a second SIM network (2000); and managing, by the multi SIM UE (100), the paging procedure by sending a notification reject message to the first SIM network (100) of the wireless communication network.

Accordingly, the embodiments herein provide a multi SIM user equipment (UE) for managing paging procedure in a wireless communication network. The multi SIM UE (100) includes a memory (140) and a processor (160) coupled with the memory (140). The processor (160) is configured to receive a paging message from a first SIM network (1000), where the multi SIM UE (100) is on an active data session on a second SIM network (2000) and read the paging message from the first SIM network (1000). Further, the processor (160) configured to determine that a higher priority service is on-going on the second SIM network (2000); perform a RACH procedure; and manage the paging procedure by sending a paging reject message to the first SIM network (1000) of the wireless communication network.

In an embodiment, the term active data session corresponds to session in which data packet due to signaling message or user plane data needs to be sent or received between the multi SIM UE (100) and the first SIM network (1000).

In this embodiment, the multi SIM UE (100) receives the paging message and based on which the multi SIM UE (100) decides whether the ongoing service on the second SIM is of higher priority or not. The paging message can contain at least one of PDU sessions, slice IDs, QOS, QCI, Paging cause, Service type, EPS bearer ID, DNN, APN, DRB ID (i.e. radio bearer ID), QFI ID, Traffic flow templates (TFT), Application ID, UE Route selection policy identifier, establishment cause, access type, access category and combination of all this parameters and not limited to indicate type of traffic is pending to be received by the multi SIM UE (100). This information aids the multi SIM UE (100) to determine what is the pending incoming traffic (or service) and the multi SIM UE (100) can compare with the service ongoing on the second SIM network (2000) within the multi SIM UE (100).

Accordingly, the embodiments herein provide a multi SIM user equipment (UE) (100) for managing paging procedure in a wireless communication network. The multi SIM UE (100) includes a memory (140) and a processor (160) coupled with the memory (140). The processor (160) is configured to receive a paging message from a first SIM network (1000), where the multi SIM UE (100) is on an active data session on a second SIM network (2000) and respond to the paging message by getting into a CONNECTED mode with the first SIM network (1000). Further, the processor (160) is configured to receive a notification message from the first SIM network (1000), where the notification message comprises a cause for establishing a connection with the first SIM network (1000); determine that a higher priority service is on-going on a second SIM network (2000); and manage the paging procedure by sending a notification reject message to the first SIM network (1000) of the wireless communication network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Accordingly, the embodiments herein provide a method for switching between a plurality of SIM networks by a multi SIM user equipment (UE) (100) in a wireless communication network. The method includes determining, by the multi SIM UE (100), that the multi SIM UE (100) needs to initiate an active data session on a second SIM network (2000) while the multi SIM UE (100) is in an active data session on a first SIM network (1000) based on one of a paging message received by the multi SIM UE (100) from the second SIM network (2000) and at least one mobile-originated (MO) activity which needs to be delivered using the second SIM network (2000). Further, the method includes sending, by the multi SIM UE (100), a leaving operator message to the first SIM network (1000) indicating that the multi SIM UE (100) is leaving the first SIM network (1000); and switching, by the multi SIM UE (100), from the first SIM network (1000) to the second SIM network (2000) by triggering procedures to initiate the active data session on the second SIM network (2000).

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1A is a block diagram of a multi SIM user equipment (UE) (100) for switching between a plurality of SIM networks in a wireless communication network, according to an embodiment as disclosed herein;

FIG. 1B is a block diagram of the first SIM network (1000) for switching between the plurality of SIM networks by the multi SIM UE (100) in the wireless communication network, according to an embodiment as disclosed herein;

FIG. 2A is a flow chart 200 illustrating a method for switching between the plurality of SIM networks by the multi SIM UE (100) in the wireless communication network, according to an embodiment as disclosed herein;

FIG. 2B is a flow chart illustrating a method for switching between the plurality of SIM networks by the multi SIM UE (100) at the first SIM network (1000), according to an embodiment as disclosed herein;

FIG. 2C is a flow chart illustrating a method for managing paging procedure by the multi SIM UE (100) in the wireless communication network, according to an embodiment as disclosed herein;

FIG. 2D is a flow chart illustrating another method for managing paging procedure by the multi SIM UE (100) in the wireless communication network, according to an embodiment as disclosed herein;

FIG. 3A illustrates a performance of the first SIM when the multi SIM UE (100) attempts to monitor the paging on the second SIM, according to the prior art;

FIG. 3B illustrates a performance of the first SIM when the multi SIM UE (100) shares a DRX information of the second SIM network (2000) to the first SIM network (1000), according to an embodiment as disclosed herein;

FIG. 3C illustrates a scenario where the UE (100) sends a medium access control (MAC) command for not scheduling data for certain duration, according to an embodiment as disclosed herein;

FIG. 4 is a flow diagram illustrating a scenario of suspension and resumption of an ongoing connection in a 3GPP system associated with a first Universal Subscriber Identity Module (USIM), according to the prior art;

FIG. 5 is a flow diagram illustrating a method for switching between the plurality of SIM networks by the UE (100) in the 4G network, according to an embodiment as disclosed herein;

FIG. 6 is a flow diagram illustrating a method for switching between the plurality of SIM networks by the UE (100) in the 5G network, according to an embodiment as disclosed herein;

FIG. 7 is a flow diagram illustrating a method for switching between the plurality of SIM networks by the UE (100) by moving the UE (100) to a RRC INACTIVE suspend state in the wireless communication network, according to an embodiment as disclosed herein;

FIG. 8 is a flow chart illustrating a method for method for paging cause negotiation with the network, according to an embodiment as disclosed herein;

FIG. 9 is a flow diagram illustrating a method for paging cause negotiation with the network using the NAS/AS message, according to an embodiment as disclosed herein;

FIG. 10 is a flow chart illustrating a method for paging cause, service for which paging is needed in NAS/AS message (partial suspension) for an exhaustive list of paging cause NAS/AS message (resumption indication), according to an embodiment as disclosed herein;

FIG. 11 is a flow diagram illustrating a method for paging cause, service for which paging is needed in NAS/AS message (partial suspension) for a new list of paging cause NAS/AS message (renegotiation), according to an embodiment as disclosed herein;

FIG. 12 is a flow chart illustrating a scenario of the UE (100) not responding to the paging messages from the wireless communication network, according to the prior art;

FIG. 13 illustrates a scenario of the wastage of the paging resources of the wireless communication network, according to the prior art;

FIG. 14 is a flow chart illustrating a method for paging rejects for unwanted services, according to an embodiment as disclosed herein;

FIG. 15 is a flow chart illustrating a method for paging with the cause value which is a secured message, according to an embodiment as disclosed herein;

FIG. 16 is a flow chart illustrating a method for the paging cause and service type reject after getting in connected mode, according to an embodiment as disclosed herein; and FIG. 17 is a flow chart illustrating a method for sending notification reject message to the network to cease further sending of the paging messages to the UE (100), according to an embodiment as disclosed herein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the specification document, the terms first SIM network and second SIM network refers to SIM networks owned by two different operators. Further, the first SIM network and second SIM network can be interchanged, and yet the invention stands true. The term multi SIM UE refers to a UE which supports s plurality of SIMS.

Accordingly, the embodiments herein provide a method for switching between a plurality of SIM networks by a multi SIM user equipment (UE) (100) in a wireless communication network. The method includes determining, by the multi SIM UE (100), that the multi SIM UE (100) needs to initiate an active data session on a second SIM network (2000) while the multi SIM UE (100) is in an active data session on a first SIM network (1000) based on one of a paging message received by the multi SIM UE (100) from the second SIM network (2000) and at least one mobile-originated (MO) activity which needs to be delivered using the second SIM network (2000). Further, the method includes sending, by the multi SIM UE (100), a leaving operator message to the first SIM network (1000) indicating that the multi SIM UE (100) is leaving the first SIM network (1000); and switching, by the multi SIM UE (100), from the first SIM network (1000) to the second SIM network (2000) by triggering procedures to initiate the active data session on the second SIM network (2000).

The proposed method focuses on the UE which have a hardware limitation that they will not be able to communicate, either in uplink or downlink direction for example 1 Rx/Tx for all the active SIM cards in the UE. The software part of such UEs tries to optimize and make a decision which SIM operator or SIM operators the UE should communicate at any given time among the available SIM cards in the UE.

Referring now to the drawings, and more particularly to FIGS. 1A through 17, where similar reference characters denote corresponding features consistently throughout the figures, there are shown preferred embodiments.

FIG. 1A is a block diagram of a multi SIM user equipment (UE) (100) for switching between a plurality of SIM networks in a wireless communication network, according to an embodiment as disclosed herein.

Referring to the FIG. 1A, the multi SIM UE (100) can be, for example, a mobile phone, a smart phone, Personal Digital Assistant (PDA), a tablet, a wearable device, or the like. In an embodiment, the multi SIM UE (100) can include a communicator (120), a memory (140) and a processor (160)

In an embodiment, the communicator (120) is configured to receive a paging message from one of a first SIM network (1000) and a second SIM network (2000). The first SIM network (1000) is operated by a first operator and the second SIM network (2000) is operated by a second operator.

The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

In an embodiment, the processor (160) includes an operator management engine (162), a services management engine (164) and a paging management engine (166).

In an embodiment, the operator management engine (162) is configured to determine that the multi SIM UE (100) needs to initiate an active data session on the second SIM network (2000) while the multi SIM UE (100) is in an active data session on the first SIM network (1000). The determination of the initiation of the active data session on the second SIM network (2000) is based on one of a paging message received by the multi SIM UE (100) from the second SIM network (2000) and at least one mobile-originated (MO) activity which needs to be delivered using the second SIM network (2000). Further, the operator management engine (162) is configured to send a leaving operator message to the first SIM network (1000) indicating that the multi SIM UE (100) is leaving the first SIM network (1000) and switch from the first SIM network (1000) to the second SIM network (2000) by triggering procedures to initiate the active data session on the second SIM network (2000). The leaving operator message is one of a Non-access stratum (NAS) or Access stratum (AS) signalling message, which is configured to indicate switch from one network to another network by the multi SIM UE (100).

Further, the operator management engine (162) is configured to determine a change in at least one condition associated with the multi SIM UE (100) and receive an input form the services management engine (164) indicating the updated list of services. Furthermore, the operator management engine (162) is configured to re-negotiate with the first SIM network (1000) by sending one of an updated leaving operator message to the first SIM network (1000) and a single indication to the first SIM network (1000). The single indication to the first SIM network (1000) indicates that the first SIM network (1000) is allowed to page the multi SIM UE (100) for any service or it can indicate none of the services are allowed. The single indication to the first SIM network (1000) is one of a NAS signalling message and an AS signalling message.

In an embodiment, the services management engine (164) is configured to determine a list of services for which the multi SIM UE (100) wishes to receive the paging message from the first SIM network (1000) and a list of services for which the multi SIM UE (100) does not wish to receive the paging message from the first SIM network (1000). The list of services is included in the leaving operator message. The list of services is one of PDU session IDs, slice IDs, QOS, QCI, Paging cause, Service type EPS bearer ID, DNN, APN, DRB ID (i.e. radio bearer ID), QFI ID, Traffic flow templates (TFT), Application ID, establishment cause, access type, access category, UE Route selection policy identifier and combination of all this parameters and not limited to. The leaving operator message is one of a NAS signalling message and an AS signalling message. The leaving operator message includes a timer indicating a duration during which the multi SIM UE (100) does not accept downlink data from the first SIM network (1000) based on the list of services allowed indicated by the multi SIM UE (100).

The services management engine (164) is configured to determine that the list of services for which the multi SIM UE (100) wants to receive the paging message and the list of services for which the multi SIM UE (100) does not want to receive the paging message is changed based on the change in the at least one condition associated with the multi SIM UE (100). Further, the services management engine (164) is configured to send the updated list of services to the operator management engine (162). The updated list of services for which the multi SIM UE (100) wants to receive the paging message from the first SIM network (1000) is one of: delta services information and an exhaustive list of services. The delta information indicates incremental changes in the services and the exhaustive list of services is a union of earlier indicated services plus the incremental changes. For example let us say multi SIM UE (100) indicated services A, B. C are allowed to the first SIM network (1000), then after some time the conditions in the multi SIM UE (100) changes and now the multi SIM UE (100) wants to be allowed for one more service i.e. D. Thus the multi SIM UE (100) now indicate the delta service "D" to be allowed or the multi SIM UE (100) can again provide the exhaustive list of allowed services i.e. A, B. C and D to the first SIM network (1000). Similarly, the multi SIM UE (100) can indicate non-allowed services in the delta information or exhaustive list to the first SIM network (1000).

In an embodiment, the paging management engine (166) is configured to read the paging message from the first SIM network (1000) and determine that a higher priority service is on-going on the second SIM network (2000). Further, the paging management engine (166) is configured to manage the paging procedure by sending a paging reject message to the first SIM network (1000) of the wireless communication network. The paging reject message indicates to the first SIM network (1000) that the multi SIM UE (100) is in a BUSY state and that the multi SIM UE (100) is not responding to the paging message. The paging reject message is one of a NAS message and an AS message. The paging reject message includes at least one of: a list of services for which the multi SIM UE (100) wants to receive the paging message and a list of services for which the UE does not want to receive the paging message. The list of services for which the multi SIM UE (100) wants to receive the paging message and a list of services for which the multi SIM UE (100) does not want to receive the paging message is one of PDU sessions (IDs), slice IDs, QOS, QCI, Paging cause, Service type, EPS bearer ID, DNN, APN, DRB ID (i.e. radio bearer ID), QFI ID, Traffic flow templates (TFT), Application ID, UE Route selection policy identifier, establishment cause, access type, access category and combination of all this parameters and not limited to. The paging reject message comprises a timer indicating a duration during which the multi SIM UE (100) does not accept the paging message from the first SIM network (1000) other than the services indicated in the paging reject message.

The timer in general for both the leaving operator message or the paging reject message indicates to the first SIM network (1000) the duration that the first SIM network (1000) should not page the multi SIM UE (100) for list of services for which the multi SIM UE (100) does not want to receive the paging message.

The timer in general for both the leaving operator message or the paging reject message indicates to the first SIM network (1000) the duration that first SIM network (1000) should not page the multi SIM UE (100) for the services except a list of services for which the multi SIM UE (100) indicated that it wants to receive the paging message.

In another embodiment, the paging management engine (166) is configured to respond to the paging message by getting into a CONNECTED mode with the first SIM network (1000) and receive a notification message from the first SIM network (1000). The notification message comprises a cause for establishing a connection with the first SIM network (1000). Further, the paging management engine (166) is configured to that the active data session on-going on the second SIM network (2000) is a higher priority service than a service that the multi SIM UE (100) obtains on the first SIM network (1000) and manage the paging procedure by sending a notification reject message to the first SIM network (1000) of the wireless communication network. The notification reject message is one of an AS message and a NAS message. The notification reject message comprises a reject cause value, a timer value and at least one of: a list of services for which the multi SIM wants to receive the notification message and a list of services for which the multi SIM does not want to receive the notification message. The timer value indicates the time duration for which the UE wants to receive the notification message or does not want to receive the notification message based on list of services.

Although the FIG. 1A shows the hardware elements of the multi SIM UE (100) but it is to be understood that other embodiments are not limited thereon. In other embodiments, the multi SIM UE (100) may include less or more number of elements. Further, the labels or names of the elements are used only for illustrative purpose and does not limit the scope of the invention. One or more components can be combined together to perform same or substantially similar function.

FIG. 1B is a block diagram of the first SIM network (1000) for switching between the plurality of SIM networks by the multi SIM UE (100) in the wireless communication network, according to an embodiment as disclosed herein.

Referring to the FIG. 1B, the first SIM network (1000) can include a communicator (1200), a memory (1400) and a processor (1600).

In an embodiment, the communicator (1200) is configured to receive a leaving operator message from the multi SIM UE (100) comprising at least one of: the list of services for which the multi SIM UE (100) wants to receive the paging message from the first SIM network (1000) and the list of services for which the multi SIM UE (100) does not want to receive the paging message from the first SIM network (1000). Further, the communicator (1200) is also configured to receive a downlink data request for the multi SIM UE (100).

In another embodiment, the communicator (1200) is configured to receive a paging reject message from the multi SIM UE (100). In yet another embodiment, the communicator (1200) is configured to receive a notification reject message from the multi SIM UE (100).

The memory (1400) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1400) may, in some examples, be considered a non-transitory storage medium. The term "non-transitory" may indicate that the storage medium is not embodied in a carrier wave or a propagated signal. However, the term "non-transitory" should not be interpreted that the memory (1400) is non-movable. In some examples, the memory (1400) is configured to store larger amounts of information than the memory. In certain examples, a non-transitory storage medium may store data that can, over time, change (e.g., in Random Access Memory (RAM) or cache).

In an embodiment, the processor (1600) includes a service determination engine (1620) and a paging control engine (1640).

The service determination engine (1620) is configured to determine whether a paging procedure is allowed for the downlink data request based on at least one of: a list of services for which the multi SIM UE (100) wants to receive the paging message from the first SIM network (1000) and a list of services for which the multi SIM UE (100) does not want to receive the paging message from the first SIM network (1000).

In another embodiment, the service determination engine (1620) is configured to determine the list of services for which the multi SIM UE (100) wants to receive the paging and the list of services for which the multi SIM UE (100) does not want to receive the paging based on the page reject message. In yet another embodiment, the service determination engine (1620) is configured to determine the list of services for which the multi SIM UE (100) wants to receive the notification message and the list of services for which the multi SIM UE (100) does not want to receive the notification message based on the notification reject message.

The paging control engine (1640) receives an input from the service determination engine (1620) regarding the paging procedure being allowed or not for the downlink data request.

Further, the paging control engine (1640) is configured to perform one of: paging procedure for the downlink data, in response to determining that the paging procedure is allowed for the downlink data based on the list of services for which the multi SIM UE (100) is allowed to receive the data from the first SIM network (1000); reject the downlink data, in response to determining that the paging procedure is not allowed for the downlink data based on the list of services for which the multi SIM UE (100) is not allowed to receive the data from the first SIM network (1000); and buffer the downlink data, in response to determining that the paging procedure is not allowed for the downlink data based on the list of services for which the multi SIM UE (100) is allowed to receive data from the first SIM network (1000).

In another embodiment, the paging control engine (1640) is configured to perform one of: stop a transmission of paging messages/notification message to the multi SIM UE (100) for the list of services for which the multi SIM UE (100) does not want to receive the paging message/notification message; and continue a transmission of the paging message/notification message to the multi SIM UE (100) for the list of services for which the multi SIM UE (100) wants to receive the paging message/notification message.

Although the FIG. 1B shows the hardware elements of the first SIM network (1000) but it is to be understood that other embodiments are not limited thereon. In other embodiments, the first SIM network (1000) may include less or more number of elements. Further, the labels or names of the elements are used only for illustrative purpose and does not limit the scope of the invention. One or more components can be combined together to perform same or substantially similar function.

FIG. 2A is a flow chart 200 illustrating a method for switching between the plurality of SIM networks by the multi SIM UE (100) in the wireless communication network, according to an embodiment as disclosed herein.

Referring to the FIG. 2A, at step 202, the multi SIM UE (100) determines that the multi SIM UE (100) needs to initiate the active data session on the second SIM network (2000) while the multi SIM UE (100) is in the active data session on the first SIM network (1000). For example, in the multi SIM UE (100) as illustrated in the FIG. 1A, the processor (160) can be configured to determine that the multi SIM UE (100) needs to initiate the active data session on the second SIM network (2000) while the multi SIM UE (100) is in the active data session on the first SIM network (1000).

At step 204, the multi SIM UE (100) sends the leaving operator message to the first SIM network (1000) indicating that the multi SIM UE (100) is leaving the first SIM network (1000). For example, in the multi SIM UE (100) as illustrated in the FIG. 1A, the processor (160) can be configured to send the leaving operator message to the first SIM network (1000) indicating that the multi SIM UE (100) is leaving the first SIM network (1000).

At step 204, the multi SIM UE (100) switches from the first SIM network (1000) to the second SIM network (2000) by triggering the procedures to initiate the active data session on the second SIM network (2000). For example, in the multi SIM UE (100) as illustrated in the FIG. 1A, the processor (160) can be configured to switch from the first SIM network (1000) to the second SIM network (2000) by triggering the procedures to initiate the active data session on the second SIM network (2000).

At step 206, the multi SIM UE (100) determines the change in at least one condition associated with multi SIM UE (100). For example, in the multi SIM UE (100) as illustrated in the FIG. 1A, the processor (160) can be configured to determine the change in at least one condition associated with multi SIM UE (100).

At step 208, the multi SIM UE (100) determines that list of services for which the multi SIM UE (100) wants to receive the paging message and the list of services for which the multi SIM UE (100) does not want to receive the paging message is changed based on change in at least one condition associated with the multi SIM UE (100). For example, in the multi SIM UE (100) as illustrated in the FIG. 1A, the processor (160) can be configured to determine that list of services for which the multi SIM UE (100) wants to receive the paging message and the list of services for which the multi SIM UE (100) does not want to receive the paging message is changed based on change in at least one condition associated with the multi SIM UE (100).

At step 210, the multi SIM UE (100) re-negotiates with the first SIM network (1000) by sending one of the updated leaving operator message to the first SIM network (1000) and the single indication to the first SIM network (1000). For example, in the multi SIM UE (100) as illustrated in the FIG. 1A, the processor (160) can be configured to re-negotiate with the first SIM network (1000) by sending one of the updated leaving operator message to the first SIM network (1000) and the single indication to the first SIM network (1000).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 2B is a flow chart illustrating a method for switching between the plurality of SIM networks by the multi SIM UE (100) at the first SIM network (1000), according to an embodiment as disclosed herein.

Referring to the FIG. 2B, at step 222, the first SIM network (1000) receives the downlink data for the multi SIM UE (100). For example, in the first SIM network (1000) as illustrated in the FIG. 1B, the processor (1600) can be configured to receive the downlink data for the multi SIM UE (100).

At step 224, the first SIM network (1000) determines whether the paging procedure is allowed for the downlink data request based on the list of services. For example, in the first SIM network (1000) as illustrated in the FIG. 1B, the processor (1600) can be configured to determine whether the paging procedure is allowed for the downlink data request based on the list of services.

At step 226, in response to determining that the paging procedure is allowed for the downlink data based on the list of services for which the multi SIM UE (100) is allowed to receive the data from the first SIM network (1000), the first SIM network (1000) performs the paging procedure for the downlink data. For example, in the first SIM network (1000) as illustrated in the FIG. 1B, the processor (1600) can be configured to perform the paging procedure for the downlink data.

At step 228, in response to determining that the paging procedure is not allowed for the downlink data based on the list of services for which the multi SIM UE (100) is not allowed to receive the data from the first SIM network (1000), the first SIM network (1000) rejects the downlink data. For example, in the first SIM network (1000) as illustrated in the FIG. 1B, the processor (1600) can be configured to reject the downlink data.

At step 230, in response to determining that the paging procedure is not allowed for the downlink data based on the list of services for which the multi SIM UE (100) is allowed to receive data from the first SIM network (1000), the first SIM network (1000) buffers the downlink data. For example, in the first SIM network (1000) as illustrated in the FIG. 1B, the processor (1600) can be configured to buffer the downlink data.

FIG. 2C is a flow chart illustrating a method for managing paging procedure by the multi SIM UE (100) in the wireless communication network, according to an embodiment as disclosed herein.

Referring to the FIG. 2C, at step 232, the multi SIM UE (100) receives the paging message from the first SIM network (1000). For example, in the multi SIM UE (100) as illustrated in the FIG. 1A, the communicator (120) can be configured to receive the paging message from the first SIM network (1000).

At step 234, the multi SIM UE (100) reads the paging message from the first SIM network (1000). For example, in the multi SIM UE (100) as illustrated in the FIG. 1A, the processor (160) can be configured to read the paging message from the first SIM network (1000).

At step 236, the multi SIM UE (100) determines that the higher priority service is on-going on the second SIM network (2000). For example, in the multi SIM UE (100) as illustrated in the FIG. 1A, the processor (160) can be configured to determine that the higher priority service is on-going on the second SIM network (2000).

At step 238, the multi SIM UE (100) manages the paging procedure by sending the paging reject message to the first SIM network (1000) of the wireless communication network. For example, in the multi SIM UE (100) as illustrated in the FIG. 1A, the processor (160) can be configured to manage the paging procedure by sending the paging reject message to the first SIM network (1000) of the wireless communication network.

FIG. 2D is a flow chart illustrating another method for managing paging procedure by the multi SIM UE (100) in the wireless communication network, according to an embodiment as disclosed herein.

Referring to the FIG. 2D, at step 242, the multi SIM UE (100) receives the paging message from the first SIM network (1000). For example, in the multi SIM UE (100) as illustrated in the FIG. 1A, the communicator (120) can be configured to receive the paging message from the first SIM network (1000).

At step 244, the multi SIM UE (100) responds to the paging message by getting into the CONNECTED mode with the first SIM network (1000). For example, in the multi SIM UE (100) as illustrated in the FIG. 1A, the processor (160) can be configured to respond to the paging message by getting into the CONNECTED mode with the first SIM network (1000).

At step 246, the multi SIM UE (100) receives the notification message from the first SIM network (1000). For example, in the multi SIM UE (100) as illustrated in the FIG. 1A, the processor (160) can be configured to receive the notification message from the first SIM network (1000).

At step 248, the multi SIM UE (100) determines that the higher priority service is on-going on the second SIM network (2000). For example, in the multi SIM UE (100) as illustrated in the FIG. 1A, the processor (160) can be configured to determine that the higher priority service is on-going on the second SIM network (2000).

At step 250, the multi SIM UE (100) manages the paging procedure by sending the notification reject message to the first SIM network (1000) of the wireless communication network. For example, in the multi SIM UE (100) as illustrated in the FIG. 1A, the processor (160) can be configured to manages the paging procedure by sending the notification reject message to the first SIM network (1000) of the wireless communication network.

FIG. 3A illustrates a performance of the first SIM when the multi SIM UE (100) attempts to monitor the paging on the second SIM, according to the prior art.

Referring to the FIG. 3A, consider that the UE (100) is in an active communication on the first SIM. Also, the UE (100) attempts to monitor the paging on the second SIM. In the conventional methods and systems, the monitor of the paging on the second SIM results in the Rx tune on the second SIM due which there is loss of data on the first SIM of the UE (100).

FIG. 3B illustrates a performance of the first SIM when the multi SIM UE (100) shares a DRX information of the second SIM network (2000) to the first SIM network (1000), according to an embodiment as disclosed herein.

Referring to the FIG. 3B, the first SIM of the UE (100) informs the DRX information of the second SIM to the second SIM network (2000) via the RRC/NAS signaling message. When the first SIM is active in a data session, the first SIM network (1000) shall not send the MT data in the duration when the UE (100) tune away (i.e. listens) to the second SIM network (2000) during the DRX interval. The first SIM network (1000) does not allocate the grant to the UE (100) in the DRX interval of the second SIM. The UE (100) can tune-away to the second SIM for receiving the paging without any data loss on the first SIM network (1000).

FIG. 3C illustrates a scenario where the UE (100) sends a medium access control (MAC) command for not scheduling data for certain duration, according to an embodiment as disclosed herein.

Consider that the UE (100) has an active data session ongoing on the first SIM. Consider that the UE (100) wants to move to the second SIM for the reading paging. Then the UE (100) sends the MAC layer command to the first SIM network (1000) for not scheduling the data for certain numbers of frames/slots or time duration. The number of frames/slots or time duration can be pre-configured via the RRC signaling or the UE (100) can indicate in the MAC layer command dynamically. The first SIM network (1000) will not send any DL data for a given number of frames/slot or time duration based on the MAC layer command. In this duration, the UE (100) reads the paging on the second SIM and returns back to the active data session on the first SIM.

FIG. 4 is a flow diagram illustrating a scenario of suspension and resumption of an ongoing connection in a 3GPP system associated with a first Universal Subscriber Identity Module (USIM), according to the prior art.

Referring to the FIG. 4, consider the UE (100) with the first SIM and the second SIM where both the first SIM and the second SIM are USIMs. Consider that the first SIM is in a high speed cellular link i.e., global wordline (GWL) idle mode or active mode on the LTE, registered and the second SIM is in a G or W mode. Further, at step 1, consider that a voice call is triggered over the second SIM. At step 2, due to the triggering of the voice call, a radio link failure (RLF) or out of service occurs at the first SIM of the UE (100). Furthermore, at step 3, the second SIM network (2000) initiates a paging for the MT data or the MT VoLTE calls on the first SIM. However, the first SIM may not respond to the paging of the SIM network (2000) resulting in the wastage of the resources.

In the conventional methods and systems, there is no mechanism allowing for the suspension (or release) and the resumption of an ongoing connection in the 3GPP system associated with the first USIM, so that the UE (100) can temporarily leave to the 3GPP system associated with the second USIM, and then return to the 3GPP system in a network-controlled manner both in 4G and 5G.

FIG. 5 is a flow diagram illustrating a method for switching between the plurality of SIM networks by the UE (100) in the 4G network, according to an embodiment as disclosed herein.

Referring to the FIG. 5, at step 1, consider that the UE (100) is in the active data session over the first SIM network (1000). At step 2, the UE (100) receives the paging message comprising the cause, the service type etc. from the second SIM network (2000). At step 3, the UE (100) wants to suspend the active data session on the first SIM to respond to one of the paging message received from the second SIM or for a mobile originated (MO) transaction on the second SIM.

At step 4, the UE (100) sends the NAS or AS signalling message to the first SIM network (1000) to suspend the connection (e.g. extended service request with cause value for suspending in the dual SIM case). Further, the UE (100) receives a connection release message from the first SIM network (1000) which terminates the active data session on the first SIM of the UE (100). In yet another embodiment the multi SIM UE (100) may not receive or the multi SIM UE (100) will not wait to receive the release message from the first SIM network (1000) and the multi SIM UE (100) will move away from the first SIM network (1000). Since the data session is no more active on the first SIM of the UE (100), the first SIM network (1000) does not send the downlink data to the UE (100) from the step 6 onwards.

At step 7, the connection is established over the second SIM of the UE (100) after executing either the NAS service request or the resumption procedure. Further, at step 8, the NAS or the AS signalling message to suspend or release the connection (e.g. extended service request with the cause value for suspending in dual SIM case or RRCConnection release) over the second SIM of the UE (100) is executed. At step 9, the UE (100) sends the NAS signalling message to the first SIM network (1000) to resume the connection over the first SIM of the UE (100). From, step 10 onwards the service on the first SIM is resumed.

Therefore, unlike to the conventional methods and systems where one SIM does not inform the other SIM before switching the network, in the proposed method, the UE (100) informs the first SIM network (1000) before switching to the second SIM network (2000). Hence, the resources on the first SIM network (1000) are not wasted.

FIG. 6 is a flow diagram illustrating a method for switching between the plurality of SIM networks by the UE (100) in the 5G network, according to an embodiment as disclosed herein.

Referring to the FIG. 6, in conjunction with the FIG. 5, the steps 1 to 6 in the FIG. 6 are substantially same as the steps 1 to 6 in the FIG. 5 and hence repeated description is omitted. At step 7, the second SIM network (2000) indicates the second SIM to move to the idle mode in the 5G network.

At step 8, the UE (100) sends the NAS signalling message to the first SIM network (1000) to perform the registration (example a TAU message) to resume the connection over the first SIM of the UE (100). From, step 9 onwards the service on the first SIM is resumed.

FIG. 7 is a flow diagram illustrating a method for switching between the plurality of SIM networks by the UE (100) by moving the UE (100) to a RRC INACTIVE suspend state in the wireless communication network, according to an embodiment as disclosed herein.

Referring to the FIG. 7, at step 1, consider that the UE (100) is in the active data session over the first SIM network (1000). At step 2, the UE (100) receives the paging message comprising the cause, the service type etc. from the second SIM network (2000). At step 3, the UE (100) sends the NAS/RRC signalling message to move the UE (100) to RRC INACTIVE suspend state from the RRC CONN state.

At step 4, the first SIM network (1000) sends the connection release message to the UE (100) with the indication to move to the UE (100) to the RRC INACTIVE suspend state. Further, at step 5, the first SIM is moved to the RRC INACTIVE suspend state. Furthermore, at step 6, the second SIM network (2000) moves the second SIM to the idle mode.

At step 7, the UE (100) sends the NAS/RRC signalling message to the first SIM network (1000) to change the RRC state of the UE (100) to the RRC CONN state. Therefore, after step 8, the UE (100) resumes the services indicated by the UE (100).

Therefore, the state behavior of the UE (100) will be the same as the RRC INACTIVE state. Additionally in the RRC INACTIVE state, the gNB shall not send the DL Data (i.e. no RAN level paging). Instead, the gNB can buffer on the DL data on the network side or reject the request to send the DL data or signaling and indicate to the sources node. The RRC state on the UE (100) and the network side can move to the state by the UE (100) triggered RRC signaling/NAS signaling message.

In an embodiment, the solution in 5G-enhancement is as below:

When the UE (100) detects MM congestion on one SIM card (SIM1), the UE (100) can use the NAS/RRC signaling message to move the RRC state to RRC INACTIVE suspend and move to other SIM card (SIM2). In this case, even if the congestion gets cleared on the network side, the DL Data/paging will not come. Once the SIM 2 is Idle while the MM congestion timer is running, the UE (100) can Move to the IDLE Mode on the SIM 1 so that the network can send the DL Data/paging once the Congestion ends on the Network side.

Another alternative is the behavior of the RRC INACTIVE suspend state is that there will not be a complete suspension of the data. Instead, the network can configure large values of C-DRX where it can send some priority signaling.

FIG. 8 is a flow chart illustrating a method for method for paging cause negotiation with the network, according to an embodiment as disclosed herein.

Referring to the FIG. 8, the UE (100) negotiates/informs the list of paging causes for which the UE (100) wants to listen the paging based on the USIM configuration or the user preferences or both from the second SIM network (2000), as described in step 1 and step 2.

At step 4, the second SIM network (2000) on receiving the incoming data/request, at step 5, determines whether the paging arrives with the cause value which is allowed by the UE (100). If the paging arrives with the cause value which is allowed by the UE (100), then the second SIM network (2000) pages to the UE (100). If the paging cause is not allowed by the UE (100) then the second SIM network (2000) does not page to the UE (100). The second SIM network (2000) sends reject to requesting node as the network is unable to page to the UE (100). The requesting node can buffer the data and retry after sometime. The UE (100) can negotiate the paging causes along with the timer value for which the paging is allowed and the paging cause/timer value for which the paging is not allowed. The UE (100) can negotiate the paging cause value or the service types with the second SIM network (2000). The negotiation helps the second SIM network (2000) in saving resources for unwanted paging. Possibility of re-negotiating the paging causes.

FIG. 9 is a flow diagram illustrating a method for paging cause negotiation with the network using the NAS/AS message, according to an embodiment as disclosed herein.

Referring to the FIG. 9, in conjunction with the FIG. 8, the UE (100) can negotiate/inform the list of paging causes for which device wants to listen paging based on the USIM configuration or the user preferences or both. The UE (100) can negotiate with the second SIM network (2000) via the NAS/AS message. The list of paging cause for which the second SIM network (2000) shall page the UE (100) which the UE (100) is going to respond. In the same message, if no paging cause is shared with the second SIM network (2000), then the second SIM network (2000) shall not page the UE (100) for any services which is equivalent to the suspend state. At any time, the UE (100) can re-negotiate with the second SIM network (2000) for the list of paging cause. When the UE (100) has to resume the connection, the UE (100) can share the exhaustive list of paging cause. The second SIM network (2000) will page to the UE (100) only when paging is coming with allowed cause value by the UE (100). If the paging cause is not allowed by the UE (100) then second SIM network (2000) does not page to the UE (100). The second SIM network (2000) sends the reject to requesting node as the second SIM network (2000) is unable to page to the UE (100). The requesting node can buffer the data and retry after sometime. The UE (100) can negotiate the paging causes along with the timer value for which the paging is allowed and the paging cause/timer value for which the paging is not allowed. The UE (100) can negotiate the paging cause value or service types with the second SIM network (2000). The negotiation helps the second SIM network (2000) in saving resources for unwanted paging. The service for which MT data is pending can be indicated by using the paging cause or service type or the PDU session (for example PDU session ID) or the DRB ID or QCI or 5QI. The UE (100) based on the paging cause or the service type or the PDU session or the DRB ID as part of the paging or the notification message (after getting into connected mode) can decide if the UE (100) really needs to react to the paging or proceed with further procedures which can move the UE (100) into connected and initiate the data transmission for the service.

In an embodiment, "Paging cause" can be used by the network to indicate type of MT data pending to the UE (100). The information can also be conveyed using service type or the PDU session (for example PDU session ID) or the DRB ID or QCI or 5QI, establishment cause, access type or access category or PDU session IDs, slice IDs, QOS, QCI, Paging cause, Service type, EPS bearer ID, DNN, APN, DRB ID (i.e. radio bearer ID), QFI ID, Traffic flow templates, Application ID, UE Route selection policy identifier, establishment cause, access type, access category and combination of all this parameters and not limited to. In general network can indicate the service which is pending to be delivered to the UE. With the information, the UE (100) understands that a request to get into connected mode is for which service and then the UE (100) based on the information received in the downlink direction (either part of paging message or NAS or AS message) compares with existing ongoing service on the other second SIM. If the UE (100) finds that requested service on the first SIM is of higher priority, then UE (100) (on the second SIM) gets into the connected mode or remains in the connected mode by continuing with remaining NAS/AS procedures (in this case the existing service on the first SIM will be impacted) otherwise if the UE (100) finds the second SIM service is lower priority one when compared to the service ongoing on the first SIM then the UE (100) will not respond to the paging on the second SIM network (2000) or get into IDLE mode as quickly as possible on the second SIM network (2000) (in this case the existing service on the first SIM will not be impacted).

FIG. 10 is a flow chart illustrating a method for paging cause, service for which paging is needed in NAS/AS message (partial suspension) for an exhaustive list of paging cause NAS/AS message (resumption indication), according to an embodiment as disclosed herein.

Referring to the FIG. 10, at step 1, the UE (100) is in the active data session with the first SIM network (1000) and at step 2, the UE (100) receives the paging message from the second SIM network (2000). At step 3, the UE (100) wants to suspend the first SIM in response to the paging message received from the second SIM network (2000) or for the MO transaction on the second SIM. Hence, the UE (100) switches to the second SIM. At step 4, the UE (100) shares the list of paging cause, services for which the paging is needed (or not needed) in the NAS/AS message to the first SIM network (1000). Further, at step 5, the UE (100) sends the service request to the second SIM network (2000) and gets into connected mode with the second SIM network (2000) leading to the activation of data session at step 6.

At step 7, the first SIM network (1000) receives the incoming data request and at step 8, the first SIM network (1000) determines whether the paging can be performed or not based on list shared by the UE (100).

At some instant of time, the UE (100) determines that the condition on the UE (100) side has changed and the UE (100) would want to stop the partial suspension i.e., the first SIM network (1000) can page the UE (100) for any service. Thus, the UE (100) does a re-negotiation with the first SIM network (1000) indicating the list of services currently based on the changes, which are allowed. At step 9, the UE (100) sends the exhaustive list of the paging causes, the services for which the paging is allowed (or single indication which indicates everything is allowed) in the NAS/AS message.

FIG. 11 is a flow diagram illustrating a method for paging cause, service for which paging is needed in NAS/AS message (partial suspension) for a new list of paging cause NAS/AS message (renegotiation), according to an embodiment as disclosed herein.

Referring to the FIG. 11, the steps 1 to 8 in the FIG. 11 are substantially the same as the steps 1 to 8 in the FIG. 10, and hence repeated description is omitted. At some instant of time, the UE (100) determines that the condition on the UE (100) side has changed and the UE (100) would want to increase or reduce the list of services for which the data can be received from the first SIM network (1000). Thus, the UE (100) does a re-negotiation with the first SIM network (1000) indicating the list of services currently based on the changes, which are allowed. At step 9, the UE (100) sends the exhaustive list of the paging causes, the services for which the paging is allowed (or single indication which indicates everything is allowed) in the NAS/AS message.

FIG. 12 is a flow chart illustrating a scenario of the UE (100) not responding to the paging messages from the wireless communication network, according to the prior art.

Referring to the FIG. 12, at step 1, consider that the UE (100) is in the active data session on the second SIM network (2000). At step 2, the first SIM network (1000) has no idea that the multi SIM UE (100) is currently busy on the second SIM network (2000) and at step 3, the first SIM network (1000) initiates the paging procedure by sending the paging messages to the UE (100).

At step 4, the UE (100) reads the paging messages but as the higher priority service is ongoing on the second SIM network (2000), the UE (100) does not respond to the paging messages received from the first SIM network (1000). The first SIM network (1000) has no idea that the UE (100) may not respond to the paging messages and hence the first SIM network (1000) continues to page the UE (100) leading to the wastage of network resources.

FIG. 13 illustrates a scenario of the wastage of the paging resources of the wireless communication network, according to the prior art.

Referring to the FIG. 13, consider the UE (100) is mobile and communicating with the second SIM network (2000). At a given point of time, the UE (100) is located in a cell identified by TA3. At step 1, the AMF of the first SIM network (1000) receives a MT notification. Further, at step 2, the AMF of the first SIM network (1000) starts paging the plurality of UEs located in various cells. The UE (100) located in the cell identified by the TA3 also receives the paging messages. However, since the UE (100) is communicating with the second SIM network (2000), the UE (100) does not respond to the paging messages received from the first SIM network (1000). The first SIM network (1000) keeps paging and wasting the paging resources.

FIG. 14 is a flow chart illustrating a method for paging rejects for unwanted services, according to an embodiment as disclosed herein.

In the conventional methods and systems, there is no handling of service prioritization i.e., the UE (100) behavior upon reception of the paging information when the UE (100) is driven by USIM configuration or user preferences or both is not defined. Referring to the FIG. 10, consider that the UE (100) is in the active data session with the first SIM network (1000) and at step 2, the UE (100) receives the paging messages from the second SIM network (2000).

In the proposed method, the UE (100) sends the paging rejects for the unwanted services, when the UE (100) receives the paging with cause value (service type) then at step 3, the UE (100) checks the ongoing service in the first SIM and based on one of: the USIM configuration and the user preferences or both, if the UE (100) decides that the current paging is not a priority compared to the service on the first SIM, then the UE (100) sends the paging reject message to the network (step 4). In the paging reject (AS or NAS message) message the UE (100) includes the reject cause value, a timer value and list of services for which the UE (100) wants to receive the paging and the list of paging cause/services for which the UE (100) does not want to receive the paging. Further, because of the paging reject, the second SIM network (2000) will cease to send further paging messages to the UE (100) for the given transaction (step 5). The information that the UE (100) do not want to respond to the paging can be sent in the first secured message from the UE (100). The paging message may contain preamble information so that the UE (100) can reject the paging using contention free RACH procedure. The paging reject message can be inferred from the contention free RACH message. Alternately, the paging reject message can be sent once the UE (100) moves to the connected mode as early as possible using the AS message, so that not many resources of the second SIM network (2000) are wasted to communicate the paging reject (NAS or AS message).

FIG. 15 is a flow chart illustrating a method for paging with the cause value which is a secured message, according to an embodiment as disclosed herein.

Referring to the FIG. 15, at step 1, the UE (100) negotiates secure paging with the second SIM network (2000) in the NAS/AS signalling. At step 2, the UE (100) is in the active data session with the first SIM network (1000). Further, at step 3, if the paging is being done with the cause value/ service type, then the second SIM network (2000) encrypts the paging message with the UE identity of some algorithm. At step 4, the paging message with encrypted (cause and service type) is received by the UE (100).

At step 5, the UE (100) decrypts the paging message with agreed algorithm and keys; and responds to the paging if needed. Further, at step 6, the UE (100) sends the paging response/reject message to the second SIM network (2000).

In general, the paging message comes on a common control channel. So, the paging message with the cause, the service type, etc. should be the secured message. The other UEs should not be able to decode the paging cause values provided by the second SIM network (2000). The paging message cause value (indicating the service) must be encrypted with UE identities (C-RNTI, M-TMSI or any other parameter) or some other existing encryption mechanism can be used. Paging security keys can be generated during RRC/NAS security command procedure. Secure paging feature can be negotiated with the wireless communication network if the UE (100) wants the secure paging messages.

FIG. 16 is a flow chart illustrating a method for the paging cause and service type reject after getting in connected mode, according to an embodiment as disclosed herein.

Referring to the FIG. 16, at step 1, the UE (100) has the data session active on the second SIM network (2000). At step 2, the first SIM network (1000) does not have idea that the UE (100) is currently busy on the second SIM network (2000) and hence sends the paging message with the cause to the UE (100) (as shown in step 3). Further, at step 4, the UE (100) reads the paging message but as the higher priority service is ongoing on the second SIM network (2000), the UE (100) does not respond to the paging message. Therefore, at step 5, the UE (100) sends the paging reject message i.e., busy indication to the first SIM network (1000).

FIG. 17 is a flow chart illustrating a method for sending notification reject message to the network to cease further sending of the paging messages to the UE (100), according to an embodiment as disclosed herein.

Referring to the FIG. 17, at step 1, the UE (100) is in the active data session with the first SIM network (1000). At step 2, the second SIM network (2000) sends the paging message to the UE (100). The UE (100) responds to the paging and gets into the connected mode (step 3). At step 4, the second SIM network (2000) sends the notification message to the UE (100) with the cause for establishing the connection. However if the UE (100) is already busy with the service of higher priority on the first SIM network (1000) then the UE (1000) shall send the notification reject (AS or NAS message) message (step 5). The UE (100) can include the reject cause value, the timer value and the list of services for which the UE (100) wants to receive the notification and/or the list of cause/services for which the UE (100) does not want to receive the notification message (i.e. avoid to page the UE). After step 6, the second SIM network (2000) ceases to send further paging messages to the UE (100) for the given transaction, in response to the notification reject message. The information that the UE (100) does not want to respond to the paging can be sent in the first secured message.

Further, at step 7, the second SIM network (2000) receives the incoming data and at step 8, the second SIM network (2000) does not page to the UE (100) and provides reject to the requesting node with the cause, the timer, etc (step 9).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a multi-subscriber identity module (SIM) user equipment (UE) in a wireless communication system, the method comprising:
    identifying, while a first SIM network is activated, an activity on a second SIM network;
    based on the identification, transmitting, to an access and mobility management function (AMF) entity, a first message indicating that the multi-SIM UE requests to be released from a radio resource control (RRC) connection on the first SIM network, wherein the first message includes paging restriction information for a restriction of a paging on the first SIM network;
    switching from the first SIM network to the second SIM network; and
    performing a data communication on the second SIM network.

2. The method of claim 1, wherein the paging restriction information indicates that:
    all paging is restricted;
    all paging is restricted, except a paging for a certain paging cause;
    all paging is restricted, except for at least one certain protocol data unit (PDU) session; or
    all paging is restricted, except a paging for a certain paging cause and at least one certain PDU session.

3. The method of claim 1, further comprising transmitting, to the AMF entity, a second message indicating that every paging on the first SIM network is allowed,
    wherein the restriction of the paging on the first SIM network stops based on the second message.

4. A method performed by an access and mobility management function (AMF) entity in a wireless communication system, the method comprising:
    receiving, from a multi-subscriber identity module (SIM) user equipment (UE), a first message indicating that the multi-SIM UE requests to be released from a radio resource control (RRC) connection on a first SIM network, wherein the first message includes paging restriction information for a restriction of a paging on the first SIM network; and
    releasing the RRC connection on the first SIM network based on the first message,
    wherein the first message is received based on an activity on a second SIM network in the multi-SIM UE while the first SIM network is activated, and
    wherein a data communication is not performed on the first SIM network and the multi- SIM UE switches from the first SIM network to the second SIM network.

5. The method of claim 4, wherein the paging restriction information indicates that:
    all paging is restricted;
    all paging is restricted, except a paging for a certain paging cause;
    all paging is restricted, except for at least one certain protocol data unit (PDU) session; or
    all paging is restricted, except a paging for a certain paging cause and at least one certain PDU session.

6. The method of claim 4, further comprising:
    receiving, from the multi-SIM UE, a second message indicating that every paging on the first SIM network is allowed; and
    stopping the restriction of the paging on the first SIM network based on the second message.

7. A multi-subscriber identity module (SIM) user equipment (UE) in a wireless communication system, the multi-SIM UE comprising:
    a transceiver; and
    a processor configured to:
        identify, while a first SIM network is activated, an activity on a second SIM network,
        based on the identification, transmit, to an access and mobility management function (AMF) entity via the transceiver, a first message indicating that the multi-SIM UE requests to be released from a radio resource control (RRC) connection on the first SIM network, wherein the first message includes paging restriction information for a restriction of a paging on the first SIM network, switch from the first SIM network to the second SIM network, and perform a data communication on the second SIM network.

8. The multi-SIM UE of claim 7, wherein the paging restriction information indicates that:
  all paging is restricted;
  all paging is restricted, except a paging for a certain paging cause;
  all paging is restricted, except for at least one certain protocol data unit (PDU) session; or
  all paging is restricted, except a paging for a certain paging cause and at least one certain PDU session.

9. The multi-SIM UE of claim 7, wherein the processor is further configured to transmit, to the AMF entity via the transceiver, a second message indicating that every paging on the first SIM network is allowed, and
  wherein the restriction of the paging on the first SIM network stops based on the second message.

10. An access and mobility management function (AMF) entity in a wireless communication system, the AMF entity comprising:
  a transceiver; and
  a processor configured to:
    receive, from a multi-subscriber identity module (SIM) user equipment (UE) via the transceiver, a first message indicating that the multi-SIM UE requests to be released from a radio resource control (RRC) connection on a first SIM network, wherein the first message includes paging restriction information for a restriction of a paging on the first SIM network, and
    release the RRC connection on the first SIM network based on the first message,
  wherein the first message is received based on an activity on a second SIM network in the multi-SIM UE while the first SIM network is activated, and
  wherein a data communication is not performed on the first SIM network and the multi-SIM UE switches from the first SIM network to the second SIM network.

11. The AMF entity of claim 10, wherein the paging restriction information indicates that:
  all paging is restricted;
  all paging is restricted, except a paging for a certain paging cause;
  all paging is restricted, except for at least one certain protocol data unit (PDU) session; or
  all paging is restricted, except a paging for a certain paging cause and at least one certain PDU session.

12. The AMF entity of claim 10, wherein the processor is further configured to:
  receive, from the multi-SIM UE via the transceiver, a second message indicating that every paging on the first SIM network is allowed, and
  stop the restriction of the paging on the first SIM network based on the second message.

* * * * *

UNITED STATES PATENT AND TRADEMARK OFFICE
CERTIFICATE OF CORRECTION

PATENT NO. : 12,302,231 B2  
APPLICATION NO. : 17/602721  
DATED : May 13, 2025  
INVENTOR(S) : Kumar et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this
Twenty-second Day of July, 2025

Coke Morgan Stewart
*Acting Director of the United States Patent and Trademark Office*